US012587966B2

(12) United States Patent (10) Patent No.: US 12,587,966 B2
Raghunathan et al. (45) Date of Patent: Mar. 24, 2026

(54) ENHANCED POWER SAVINGS THROUGH MOBILE INITIATED DORMANCY

(71) Applicant: QUALCOMM Incorporated, San Diego, CA (US)

(72) Inventors: Shravan Kumar Raghunathan, San Diego, CA (US); Srinivasan Balasubramanian, San Diego, CA (US); Parthasarathy Krishnamoorthy, San Diego, CA (US); Yonas Kidane, San Diego, CA (US); Chetan Chakravarthy, San Diego, CA (US); Kumarabhijeet Singh, San Diego, CA (US); Arvindhan Kumar, San Diego, CA (US); Krishna Rao Mandadapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 17/826,886

(22) Filed: May 27, 2022

(65) Prior Publication Data

US 2022/0295410 A1 Sep. 15, 2022

Related U.S. Application Data

(63) Continuation of application No. 16/149,534, filed on Oct. 2, 2018, now Pat. No. 11,382,042.

(Continued)

(51) Int. Cl.
*H04W 52/02* (2009.01)
*H04W 76/27* (2018.01)

(52) U.S. Cl.
CPC ... *H04W 52/0251* (2013.01); *H04W 52/0229* (2013.01); *H04W 52/0261* (2013.01); *H04W 76/27* (2018.02)

(58) Field of Classification Search
CPC ............. H04W 52/0251; H04W 76/27; H04W 52/0229; H04W 52/0261
(Continued)

(56) References Cited

U.S. PATENT DOCUMENTS 9,467,976 B2 10/2016 Dwyer et al.
10,779,234 B2 9/2020 Geng
(Continued)

FOREIGN PATENT DOCUMENTS

AU 2008202107 B2 * 10/2011 ........... H04L 1/1854
CN 101253792 A 8/2008
(Continued)

OTHER PUBLICATIONS

Chuo G., et al., "Mobile Communication Principles and Systems", 3rd Edition, Feb. 28, 2015.
(Continued)

*Primary Examiner* — Xuan Lu
(74) *Attorney, Agent, or Firm* — QUALCOMM Incorporated

(57) ABSTRACT

Methods, systems, and devices are described for enhanced power savings in wireless devices through mobile initiated dormancy procedure. A user equipment (UE) may establish radio resource control (RRC) connectivity with a base station of the network, and transmit and receive one or more distinct signaling messages for dormancy state initialization and suspension at the UE. Dormancy state implementation at the UE may conserve available power resources at the UE during periods of inactive data transaction. The one or more signaling messages may contain a single or multi-bit indication for the receiving device, and may be transmitted via direct signaling on upper layer protocols of the data network or mapped to allocated resources of a data transmission. The signaling messages may sustain synchronization between (Continued)

the interpreted functional mode of the UE at the base station and the implemented mode at the UE.

30 Claims, 18 Drawing Sheets

Related U.S. Application Data

(60) Provisional application No. 62/567,897, filed on Oct. 4, 2017.

(58) Field of Classification Search
USPC .......................................................... 370/311
See application file for complete search history.

(56) References Cited

U.S. PATENT DOCUMENTS

| | | | | |
|---|---|---|---|---|
| 2003/0211846 A1* | 11/2003 | Nagpal | ............. | H04W 52/0229 455/434 |
| 2004/0029622 A1 | 2/2004 | Laroia et al. | | |
| 2004/0235536 A1* | 11/2004 | Kim | .................. | H04W 52/0216 455/574 |
| 2005/0054389 A1 | 3/2005 | Lee et al. | | |
| 2008/0267061 A1* | 10/2008 | DiGirolamo | ...... | H04W 52/0216 370/216 |
| 2008/0273493 A1 | 11/2008 | Fong | | |
| 2009/0180414 A1 | 7/2009 | Maeda et al. | | |
| 2010/0118752 A1 | 5/2010 | Suzuki et al. | | |
| 2011/0249575 A1 | 10/2011 | Dwyer et al. | | |
| 2012/0281566 A1 | 11/2012 | Pelletier et al. | | |
| 2013/0039339 A1 | 2/2013 | Rayavarapu et al. | | |
| 2013/0142072 A1 | 6/2013 | Xu et al. | | |
| 2013/0242831 A1 | 9/2013 | Vannithamby et al. | | |
| 2014/0036794 A1* | 2/2014 | Koc | ........................ | H04L 65/80 370/329 |
| 2014/0057639 A1* | 2/2014 | Nanjaiah | ............... | H04W 76/38 455/450 |
| 2014/0220981 A1* | 8/2014 | Jheng | .................... | H04W 76/15 455/437 |
| 2015/0003312 A1 | 1/2015 | Jeong et al. | | |
| 2015/0016323 A1* | 1/2015 | Sundararajan | .... | H04W 52/0209 370/311 |
| 2015/0289149 A1* | 10/2015 | Ouyang | ................ | H04W 16/18 370/252 |
| 2016/0295637 A1* | 10/2016 | Bergquist | .............. | H04W 24/08 |
| 2017/0011210 A1* | 1/2017 | Cheong | ................... | A61B 5/681 |
| 2017/0367058 A1* | 12/2017 | Pelletier | ........... | H04W 72/0446 |
| 2018/0092040 A1 | 3/2018 | Heiska et al. | | |
| 2019/0037420 A1* | 1/2019 | Fujishiro | .............. | H04W 24/02 |
| 2019/0104474 A1 | 4/2019 | Ragunathan et al. | | |
| 2019/0110332 A1 | 4/2019 | Wikstrom et al. | | |
| 2019/0191483 A1* | 6/2019 | Ryoo | ................ | H04W 52/0229 |
| 2019/0350037 A1 | 11/2019 | Lee et al. | | |
| 2020/0178209 A1* | 6/2020 | Jin | ........................ | H04W 60/00 |
| 2020/0252907 A1 | 8/2020 | Rune | | |
| 2021/0212131 A1* | 7/2021 | Futaki | .................... | H04W 8/24 |

FOREIGN PATENT DOCUMENTS

| | | | |
|---|---|---|---|
| CN | 103283282 A | 9/2013 | |
| CN | 103460788 A | 12/2013 | |
| CN | 103517454 A | 1/2014 | |
| CN | 103858512 A | 6/2014 | |
| CN | 103858513 A | 6/2014 | |
| EP | 2442614 A1 | 4/2012 | |
| EP | 2661131 A1 | 11/2013 | |
| WO | WO-2006132469 A2 | 12/2006 | |
| WO | WO-2013024000 A1 | 2/2013 | |
| WO | 2014000650 A1 | 1/2014 | |

OTHER PUBLICATIONS

Ericsson, et al., "Clarifications on Fast Dormancy", 3GPP TSG-RAN WG2 Meeting #67bis, R2-095713, 3rd Generation Partnership Project, Mobile Competence Centre, 650, Route Des Lucioles, F-06921 Sophia-Antipolis Cedex, France, No. Miyazaki, Oct. 12, 2009, Oct. 12, 2009, XP050390218, 4 Pages, [retrieved on Oct. 6, 20096] p. 1, paragraph 1—p. 2, paragraph 2.3.

Research in Motion Limited, et al., "Fast Dormancy: A way forward", 3GPP TSG-RAN2 Meeting #63bis, R2-085134, 3rd Generation Partnership Project, Mobile Competence Centre, 650, Route Des Lucioles, F-06921 Sophia-Antipolis Cedex, France, No. Prague, Czech Republic, Sep. 23, 2008, Sep. 23, 2008, XP050320063, pp. 1-13, [retrieved on Sep. 23, 2008] p. 1, line 22-line 29.

Research in Motion Limited: "Fast Dormancy: A way forward", 3GPP TSG-RAN WG2 Meeting #63, R2-084647, (Revision of R2-084312), 3rd Generation Partnership Project, Mobile Competence Centre, 650, Route Des Lucioles, F-06921 Sophia-Antipolis Cedex, France, No. Jeju, Aug. 20, 2008, Aug. 20, 2008, 14 Pages, XP050319640.

Rim, et al., "Fast Dormancy Using Data Transfer Complete Indication", 3GPP TSG-RAN WG2 Meeting #62bis, R2-083438, Warsaw, Poland, Jun. 30-Jul. 4, 2008, 13 Pages.

Samsung: "Inactivity-based Transition to a Power Efficient State", 3GPP TSG-RAN WG2 Meeting #98, R2-1704146, Hangzhou, China, May 15-19, 2017, 3 pages.

Vodafone, et al., "UE Fast Dormancy Behaviour", 3GPP TSG-RAN WG2 Meeting #60, R2-074848, 3rd Generation Partnership Project, Technical Specification Group, Radio Access Network, Working Group 2 (WG2), No. R2-074848, Jeju, South Korea, Nov. 5-9, 2007, pp. 1-9, XP002493528.

Ericsson: "Update to the Signaling Reduction for UE State Transitions Solution", S2-152952 (Revision of S2-152885, S2-152738), SA WG2 Meeting #110-AH, Sophia-Antipolis, France, Aug.-Sep. 4, 2015, pp. 1-9.

Nokia Siemens Networks: "UE Assisted Information for eDDA", 3GPP TSG-RAN WG2 Meeting #77bis, R2-121201, Mar. 20, 2012, 4 Pages.

Huang Y., et al., "Adaptive Fast Dormancy for Energy Efficient Wireless Packet Data Communications", 2013 IEEE International Conference on Communications (ICC), IEEE, Jun. 9, 2013 (Jun. 9, 2013), XP032522015, pp. 6194-6199.

International Search Report and Written Opinion—PCT/US2018/054103—ISA/EPO—Jan. 4, 2019.

International Preliminary Report on Patentability—PCT/US2018/054103, The International Bureau of WIPO—Geneva, Switzerland, Apr. 16, 2020.

* cited by examiner

UE Power Manager

620

Connection Suspend Request Component

625

UE Dormancy Manager

630

UE State Manager

635

Connection Resume Request Component

640

615

600

| Connectivity Manager | | Base Station Dormancy Manager |
| --- | --- | --- |
| 1020 | | 1025 |
| Response Manager | | Cache Component |
| 1030 | | 1035 |

1015

1000

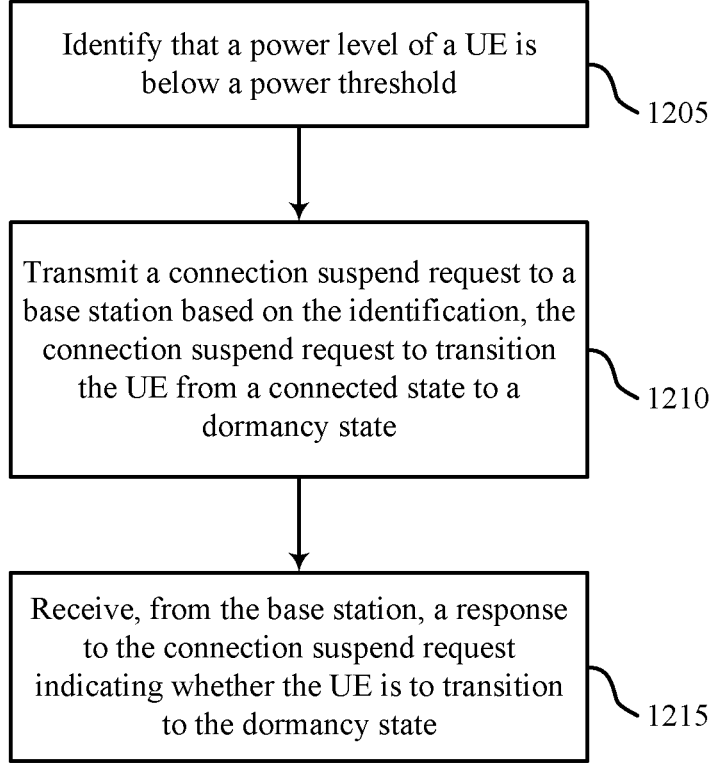

Identify that a power level of a UE is below a power threshold

⌐ 1205

Transmit a connection suspend request to a base station based on the identification, the connection suspend request to transition the UE from a connected state to a dormancy state

⌐ 1210

Receive, from the base station, a response to the connection suspend request indicating whether the UE is to transition to the dormancy state

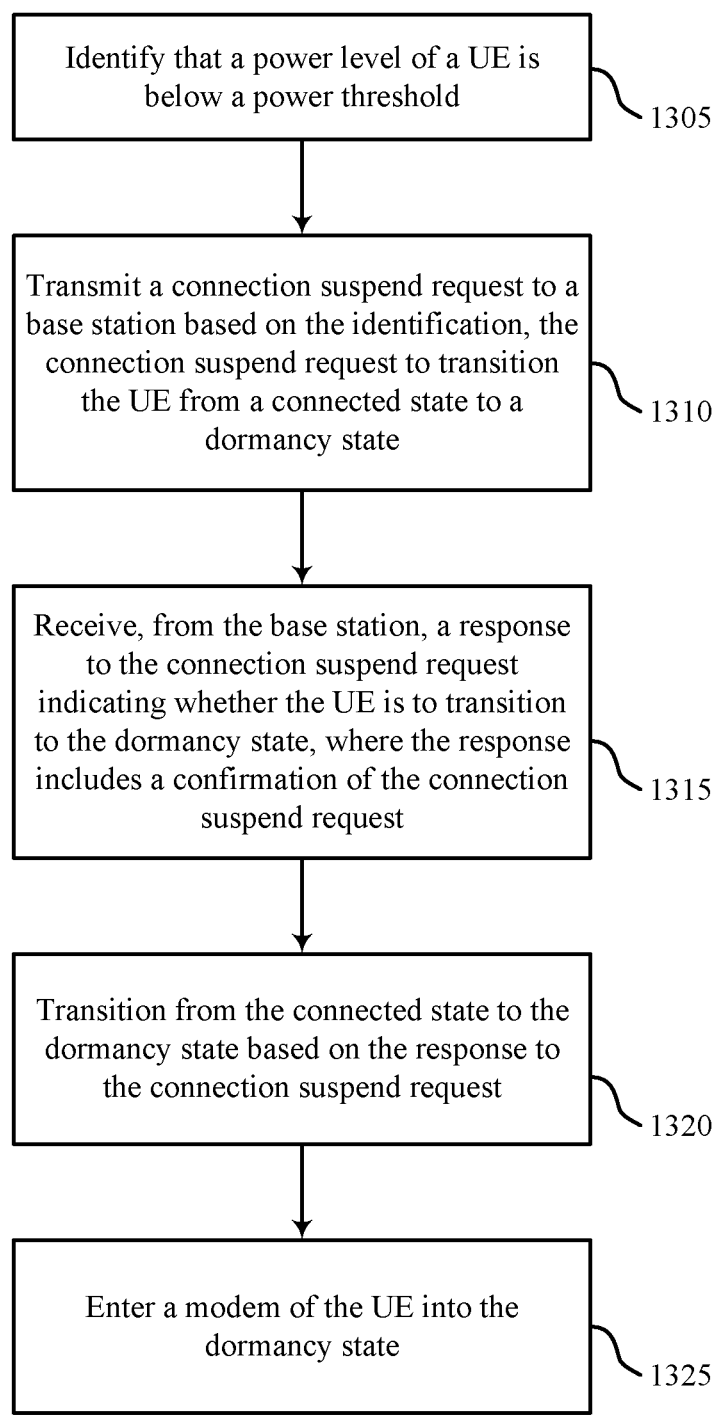

Identify that a power level of a UE is below a power threshold 1305

Transmit a connection suspend request to a base station based on the identification, the connection suspend request to transition the UE from a connected state to a dormancy state 1310

Receive, from the base station, a response to the connection suspend request indicating whether the UE is to transition to the dormancy state, where the response includes a confirmation of the connection suspend request 1315

Transition from the connected state to the dormancy state based on the response to the connection suspend request 1320

Enter a modem of the UE into the dormancy state 1325

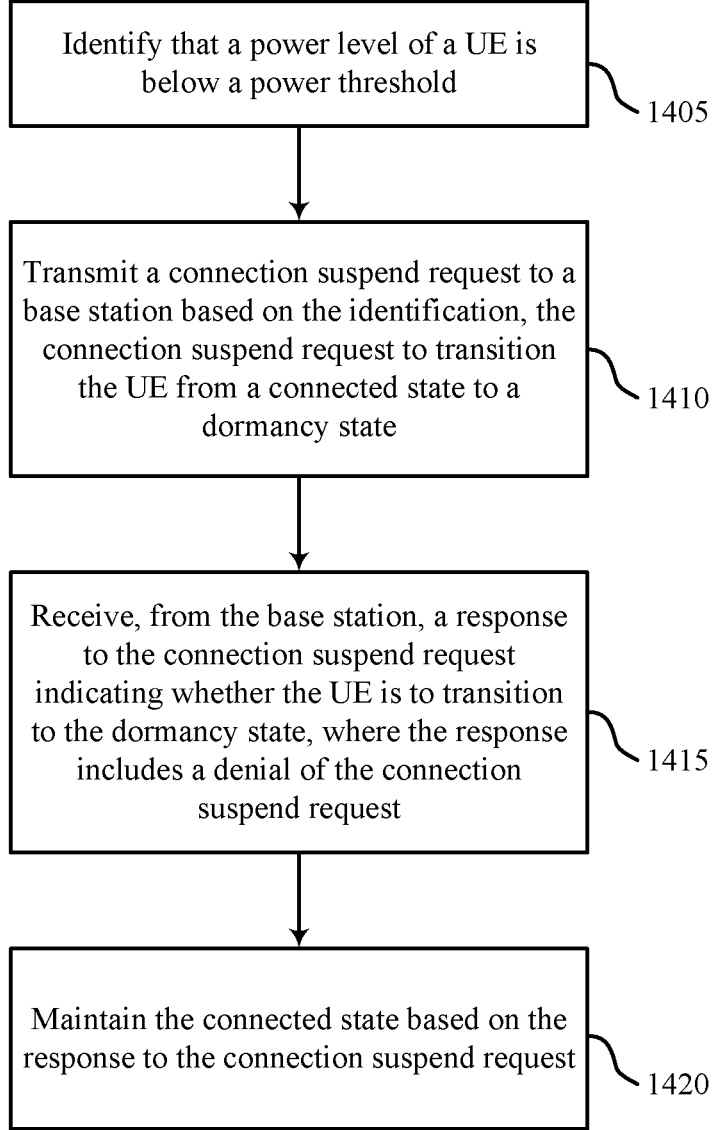

Identify that a power level of a UE is below a power threshold

1405

Transmit a connection suspend request to a base station based on the identification, the connection suspend request to transition the UE from a connected state to a dormancy state

1410

Receive, from the base station, a response to the connection suspend request indicating whether the UE is to transition to the dormancy state, where the response includes a denial of the connection suspend request

1415

Maintain the connected state based on the response to the connection suspend request

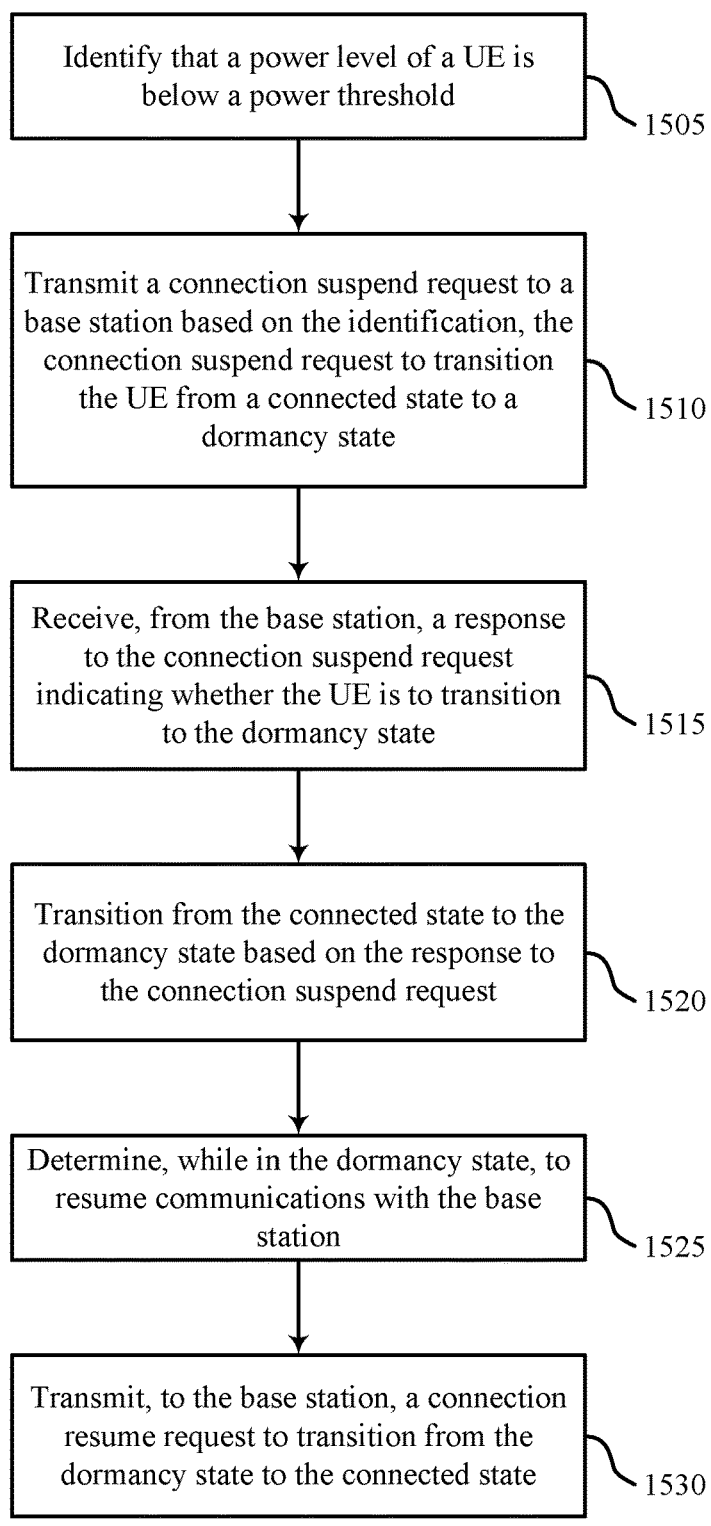

Identify that a power level of a UE is below a power threshold

1505

Transmit a connection suspend request to a base station based on the identification, the connection suspend request to transition the UE from a connected state to a dormancy state

1510

Receive, from the base station, a response to the connection suspend request indicating whether the UE is to transition to the dormancy state

1515

Transition from the connected state to the dormancy state based on the response to the connection suspend request

1520

Determine, while in the dormancy state, to resume communications with the base station

1525

Transmit, to the base station, a connection resume request to transition from the dormancy state to the connected state

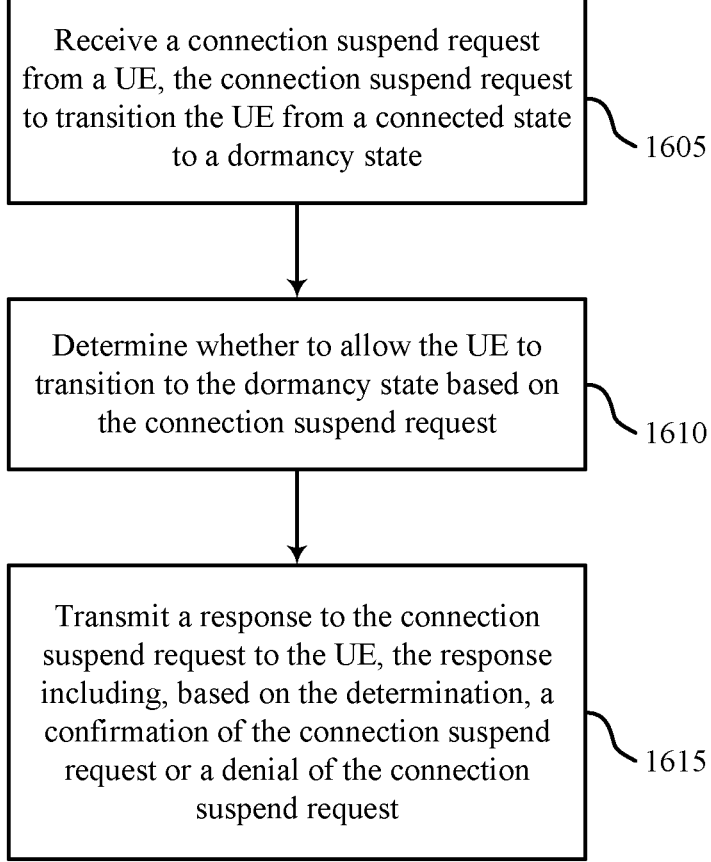

Receive a connection suspend request from a UE, the connection suspend request to transition the UE from a connected state to a dormancy state

1605

Determine whether to allow the UE to transition to the dormancy state based on the connection suspend request

1610

Transmit a response to the connection suspend request to the UE, the response including, based on the determination, a confirmation of the connection suspend request or a denial of the connection suspend request

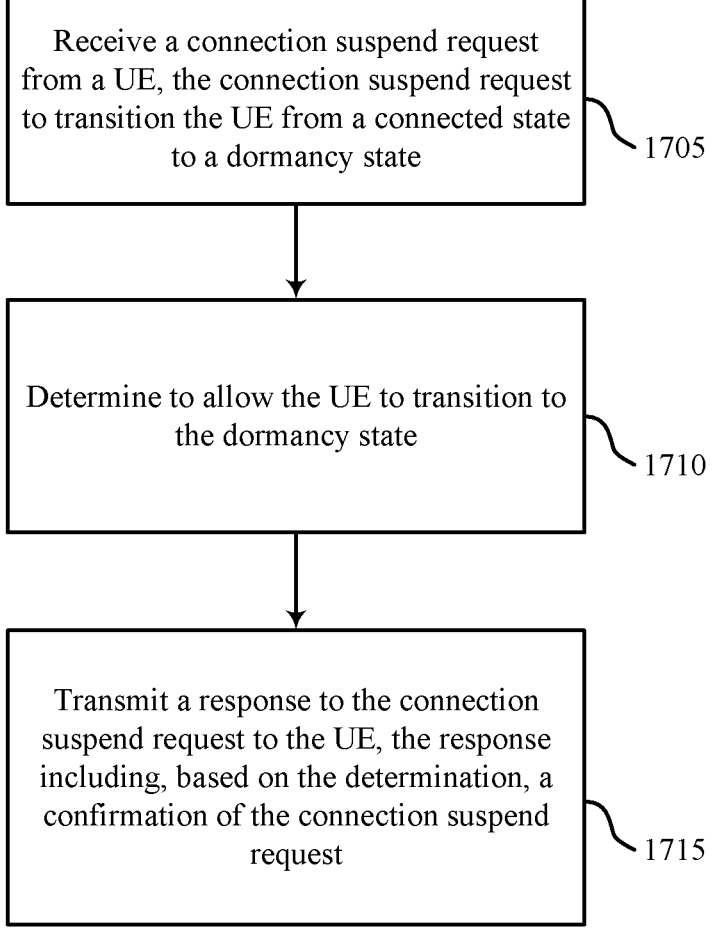

Receive a connection suspend request
from a UE, the connection suspend request
to transition the UE from a connected state
to a dormancy state

1705

Determine to allow the UE to transition to
the dormancy state

1710

Transmit a response to the connection
suspend request to the UE, the response
including, based on the determination, a
confirmation of the connection suspend
request

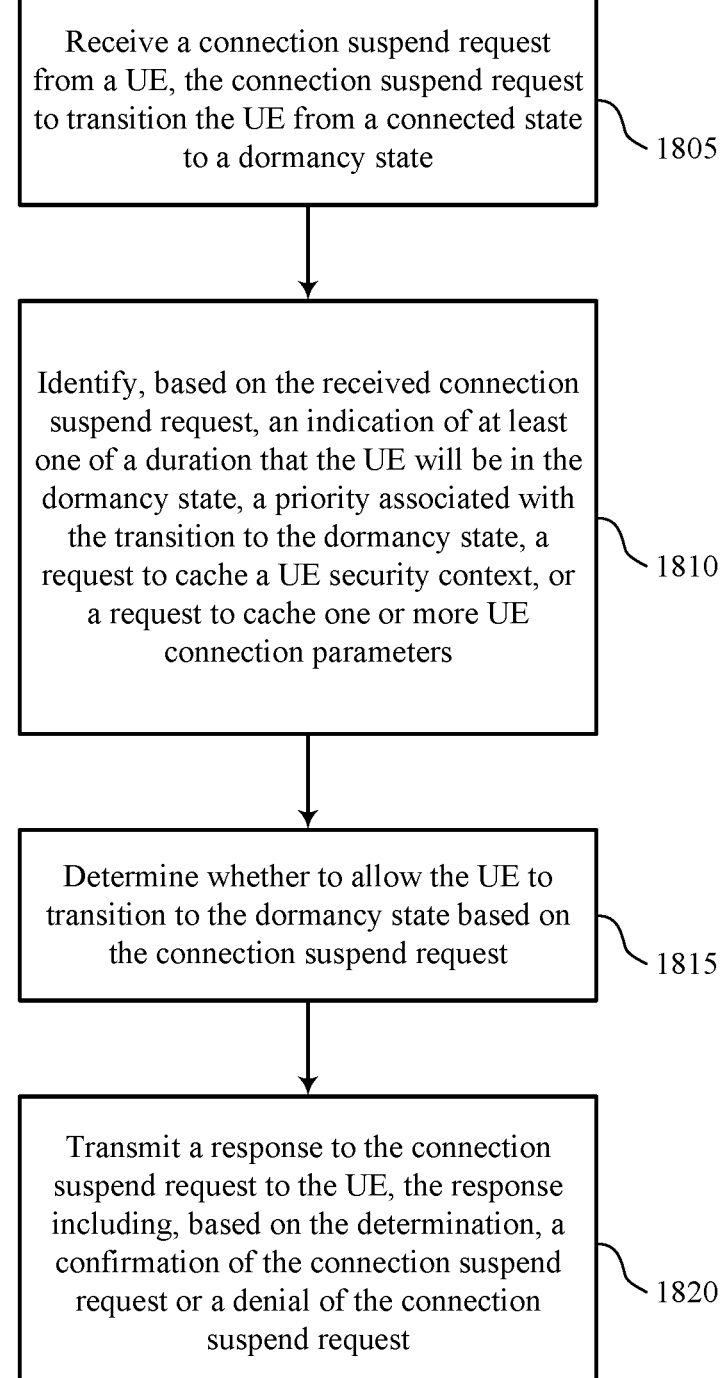

Receive a connection suspend request from a UE, the connection suspend request to transition the UE from a connected state to a dormancy state

1805

Identify, based on the received connection suspend request, an indication of at least one of a duration that the UE will be in the dormancy state, a priority associated with the transition to the dormancy state, a request to cache a UE security context, or a request to cache one or more UE connection parameters

1810

Determine whether to allow the UE to transition to the dormancy state based on the connection suspend request

1815

Transmit a response to the connection suspend request to the UE, the response including, based on the determination, a confirmation of the connection suspend request or a denial of the connection suspend request

ENHANCED POWER SAVINGS THROUGH MOBILE INITIATED DORMANCY

CROSS REFERENCES

The present application for Patent is a Continuation of U.S. patent application Ser. No. 16/149,534 by Raghunathan et al., entitled "ENHANCED POWER SAVINGS THROUGH MOBILE INITIATED DORMANCY" filed Oct. 2, 2018, claims the benefit of U.S. Provisional Patent Application No. 62/567,897 by Raghunathan, et al., entitled "ENHANCED POWER SAVINGS THROUGH MOBILE INITIATED DORMANCY," filed Oct. 4, 2017, assigned to the assignee hereof, and expressly incorporated by reference herein.

BACKGROUND

The following relates generally to wireless communication, and more specifically to power savings techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may be configured to communicate with one or more base stations of an established network connection. In some cases, to at least preserve battery resources, the UE may identify that it will be in a period of sustained communications inactivity and initiate procedures to enter a dormancy state (e.g., based on expiration of an inactivity timer). The UE may thus implement a data connection release from the base station. As a result, synchronization between the UE and base station may be impeded or lost, with sustained resource overhead being dedicated between the base station and a serving MME of the UE. In addition, the UE may experience excessive latency when attempting connection re-establishment due to repeated execution of association and authentication procedures, for example because synchronization has been lost.

SUMMARY

The described techniques relate to improved methods, systems, devices, or apparatuses that support power savings techniques, for example, through user equipment (UE) initiated dormancy procedures. Generally, the described techniques provide for signaling to a base station over established radio resource control (RRC), medium access control (MAC), and/or physical (PHY) layer resources. The signaling from the UE may include a single or multiple-bit indication for dormancy state initialization at the UE. For example, a UE may determine, via an interface indication (e.g., a command based binary protocol interface, for example a mobile station modem (MSM) interface), one or more parameters for initiating a dormancy state at the UE. The UE may evaluate the service operations and determine a lack of data activity over the established network connection. The UE may then transmit, to the coupled base station of the network connection, a request to suspend data transactions at the UE while sustaining the established RRC connectivity (e.g., a dormancy state, which may be referred to as a fast dormancy state).

The connection suspend request may correspond to a distinct bit mapping within resources of the signaled transmission, and may include additional priority (e.g., representing an urgency of the request) and duration indicators. The base station may respond with a response to the connection suspend request (a connection suspend response) and based on scheduled resources of the connection, the response may include an acknowledgement and/or confirmation, or rejection, of dormancy state initialization at the UE. The transmission and reception of the connection suspension request and response messages may sustain synchronization between the base station and the UE within the network context. In the case of received dormancy state confirmation, the UE may cache configuration parameters, including a security context, of the connection with the base station and additional layer protocols of the data network, and then enter a configured dormancy state. Resources used for the caching procedure may correspond to static or modular memory resources of local or remote storage configured for the UE. Additionally or alternatively, remote storage corresponding to the base station or established core network of the communications system may be enabled for caching contexts associated with the UE.

A trigger indication from the application processers coupled to the UE and/or an upper layer (e.g., non-access stratum (NAS)) request for services may enact connection re-establishment or resume procedures at the UE. In such cases, the UE may transmit a request to the base station for data service continuity within the preceding connectivity context of the RRC connection with the base station. In some cases, the base station may respond to the UE with a connection resume confirmation based on the cached security context and parameters of the prior connection (e.g., access stratum (AS) security context and dedicated parameters) with the UE, or new configured parameters for the UE within the network context. Alternatively, the base station may provide to the UE an indication for a connectivity release procedure, establishing an idle camped state of the UE on the network cell of the connection. As a result, the UE may implement an RRC connectivity re-establishment or RRC connectivity release while sustaining connectivity synchronization with the base station and additional network elements of the communications system.

A method of wireless communication is described. The method may include identifying that a power level of the UE is below a power threshold, transmitting a connection suspend request to a base station based at least in part on the identification, the connection suspend request to transition the UE from a connected state to a dormancy state, and receiving, from the base station, a response to the connection suspend request indicating whether the UE is to transition to the dormancy state.

An apparatus for wireless communication is described. The apparatus may include means for identifying that a power level of the UE is below a power threshold, means for transmitting a connection suspend request to a base station based at least in part on the identification, the connection suspend request to transition the UE from a connected state to a dormancy state, and means for receiving, from the base station, a response to the connection suspend request indicating whether the UE is to transition to the dormancy state.

Another apparatus for wireless communication is described. The apparatus may include a processor, memory in electronic communication with the processor, and instructions stored in the memory. The instructions may be operable to cause the processor to identify that a power level of the UE is below a power threshold, transmit a connection suspend request to a base station based at least in part on the identification, the connection suspend request to transition the UE from a connected state to a dormancy state, and receive, from the base station, a response to the connection suspend request indicating whether the UE is to transition to the dormancy state.

A non-transitory computer-readable medium for wireless communication is described. The non-transitory computer-readable medium may include instructions operable to cause a processor to identify that a power level of the UE is below a power threshold, transmit a connection suspend request to a base station based at least in part on the identification, the connection suspend request to transition the UE from a connected state to a dormancy state, and receive, from the base station, a response to the connection suspend request indicating whether the UE is to transition to the dormancy state.

Some examples of the method, apparatus, and non-transitory computer-readable medium described above may further include processes, features, means, or instructions for determining whether to transition to the dormancy state based at least in part on the received response to the connection suspend request.

Some examples of the method, apparatus, and non-transitory computer-readable medium described above may further include processes, features, means, or instructions for transitioning from the connected state to the dormancy state based at least in part on the response to the connection suspend request, wherein the response comprises a confirmation of the connection suspend request.

Some examples of the method, apparatus, and non-transitory computer-readable medium described above may further include processes, features, means, or instructions for maintaining the connected state based at least in part on the response to the connection suspend request, wherein the response comprises a denial of the connection suspend request.

Some examples of the method, apparatus, and non-transitory computer-readable medium described above may further include processes, features, means, or instructions for transitioning to an idle state based at least in part on the response to the connection suspend request, wherein the response comprises a denial of the connection suspend request.

Some examples of the method, apparatus, and non-transitory computer-readable medium described above may further include processes, features, means, or instructions for entering a modem of the UE into the dormancy state, wherein the response comprises a confirmation of the connection suspend request.

Some examples of the method, apparatus, and non-transitory computer-readable medium described above may further include processes, features, means, or instructions for transitioning from the connected state to the dormancy state based at least in part on the response to the connection suspend request. Some examples of the method, apparatus, and non-transitory computer-readable medium described above may further include processes, features, means, or instructions for determining, while in the dormancy state, to resume communications with the base station. Some examples of the method, apparatus, and non-transitory computer-readable medium described above may further include processes, features, means, or instructions for transmitting, to the base station, a connection resume request to transition from the dormancy state to the connected state.

Some examples of the method, apparatus, and non-transitory computer-readable medium described above may further include processes, features, means, or instructions for receiving, from the base station, a response to the connection resume request confirming the connection resume request. Some examples of the method, apparatus, and non-transitory computer-readable medium described above may further include processes, features, means, or instructions for transitioning from the dormancy state to the connected state based at least in part on the confirmation.

In some examples of the method, apparatus, and non-transitory computer-readable medium described above, the connection suspend request, or the response to the connection suspend request, or a connection resume request, or a response to the connection resume request may be sent using a radio resource control (RRC) message, or Layer 1 signaling, or a combination thereof.

In some examples of the method, apparatus, and non-transitory computer-readable medium described above, the Layer 1 signaling comprises uplink control information within a physical uplink control channel (PUCCH), or the uplink control information within a physical uplink shared channel (PUSCH), or an uplink medium access control (MAC) control element (CE), or a combination thereof.

In some examples of the method, apparatus, and non-transitory computer-readable medium described above, the connection suspend request comprises an indication of a duration for the dormancy state, or a priority for the transition to the dormancy state, or a request to store a security context for the UE, or a request to store one or more connection parameters for the UE, or a combination thereof.

In some examples of the method, apparatus, and non-transitory computer-readable medium described above, the connection suspend request comprises an uplink dedicated control channel (DCCH) message. In some examples of the method, apparatus, and non-transitory computer-readable medium described above, the response to the connection suspend request comprises a downlink DCCH message.

A method of wireless communication is described. The method may include receiving a connection suspend request from a user equipment (UE), the connection suspend request to transition the UE from a connected state to a dormancy state, determining whether to allow the UE to transition to the dormancy state based at least in part on the connection suspend request, and transmitting a response to the connection suspend request to the UE, the response comprising, based at least in part on the determination, a confirmation of the connection suspend request or a denial of the connection suspend request.

An apparatus for wireless communication is described. The apparatus may include means for receiving a connection suspend request from a user equipment (UE), the connection suspend request to transition the UE from a connected state to a dormancy state, means for determining whether to allow the UE to transition to the dormancy state based at least in part on the connection suspend request, and means for transmitting a response to the connection suspend request to the UE, the response comprising, based at least in part on the determination, a confirmation of the connection suspend request or a denial of the connection suspend request.

Another apparatus for wireless communication is described. The apparatus may include a processor, memory in electronic communication with the processor, and instructions stored in the memory. The instructions may be operable to cause the processor to receive a connection suspend request from a user equipment (UE), the connection suspend request to transition the UE from a connected state to a dormancy state, determine whether to allow the UE to transition to the dormancy state based at least in part on the connection suspend request, and transmit a response to the connection suspend request to the UE, the response comprising, based at least in part on the determination, a confirmation of the connection suspend request or a denial of the connection suspend request.

A non-transitory computer-readable medium for wireless communication is described. The non-transitory computer-readable medium may include instructions operable to cause a processor to receive a connection suspend request from a user equipment (UE), the connection suspend request to transition the UE from a connected state to a dormancy state, determine whether to allow the UE to transition to the dormancy state based at least in part on the connection suspend request, and transmit a response to the connection suspend request to the UE, the response comprising, based at least in part on the determination, a confirmation of the connection suspend request or a denial of the connection suspend request.

Some examples of the method, apparatus, and non-transitory computer-readable medium described above may further include processes, features, means, or instructions for determining to allow the UE to transition to the dormancy state, wherein the response to the connection suspend request comprises the confirmation of the connection suspend request.

Some examples of the method, apparatus, and non-transitory computer-readable medium described above may further include processes, features, means, or instructions for receiving, from the UE, a connection resume request to transition the UE from the dormancy state to the connected state. Some examples of the method, apparatus, and non-transitory computer-readable medium described above may further include processes, features, means, or instructions for transmitting a response to the connection resume request to the UE confirming the connection resume request.

Some examples of the method, apparatus, and non-transitory computer-readable medium described above may further include processes, features, means, or instructions for determining to deny the UE to transition to the dormancy state, wherein the response to the connection suspend request comprises the denial of the connection suspend request.

Some examples of the method, apparatus, and non-transitory computer-readable medium described above may further include processes, features, means, or instructions for transmitting, based at least in part on receiving the connection suspend request, a command for the UE to transition to an idle state.

Some examples of the method, apparatus, and non-transitory computer-readable medium described above may further include processes, features, means, or instructions for storing, by the base station based at least in part on receiving the connection suspend request, one or more communication parameter values for the UE.

In some examples of the method, apparatus, and non-transitory computer-readable medium described above, stor-ing the one or more communication parameter values comprises: storing a security context of the UE.

In some examples of the method, apparatus, and non-transitory computer-readable medium described above, the connection suspend request, or the response to the connection suspend request, or a connection resume request, or a response to the connection resume request may be sent using a radio resource control (RRC) message, or Layer 1 signaling, or a combination thereof.

In some examples of the method, apparatus, and non-transitory computer-readable medium described above, the Layer 1 signaling comprises uplink control information within a physical uplink control channel (PUCCH), or the uplink control information within a physical uplink shared channel (PUSCH), or an uplink medium access control (MAC) control element (CE), or a combination thereof.

Some examples of the method, apparatus, and non-transitory computer-readable medium described above may further include processes, features, means, or instructions for identifying, based at least in part on the received connection suspend request, an indication of a duration that the UE will be in the dormancy state, or a priority associated with the transition to the dormancy state, or a request to cache a UE security context, or a request to cache one or more UE connection parameters, or a combination thereof.

In some examples of the method, apparatus, and non-transitory computer-readable medium described above, the connection suspend request comprises an uplink dedicated control channel (DCCH) message. In some examples of the method, apparatus, and non-transitory computer-readable medium described above, the response to the connection suspend request comprises a downlink DCCH message.

BRIEF DESCRIPTION OF THE DRAWINGS

FIGS. 12 through 18 illustrate methods for power savings in accordance with aspects of the present disclosure.

DETAILED DESCRIPTION

Figure 1:
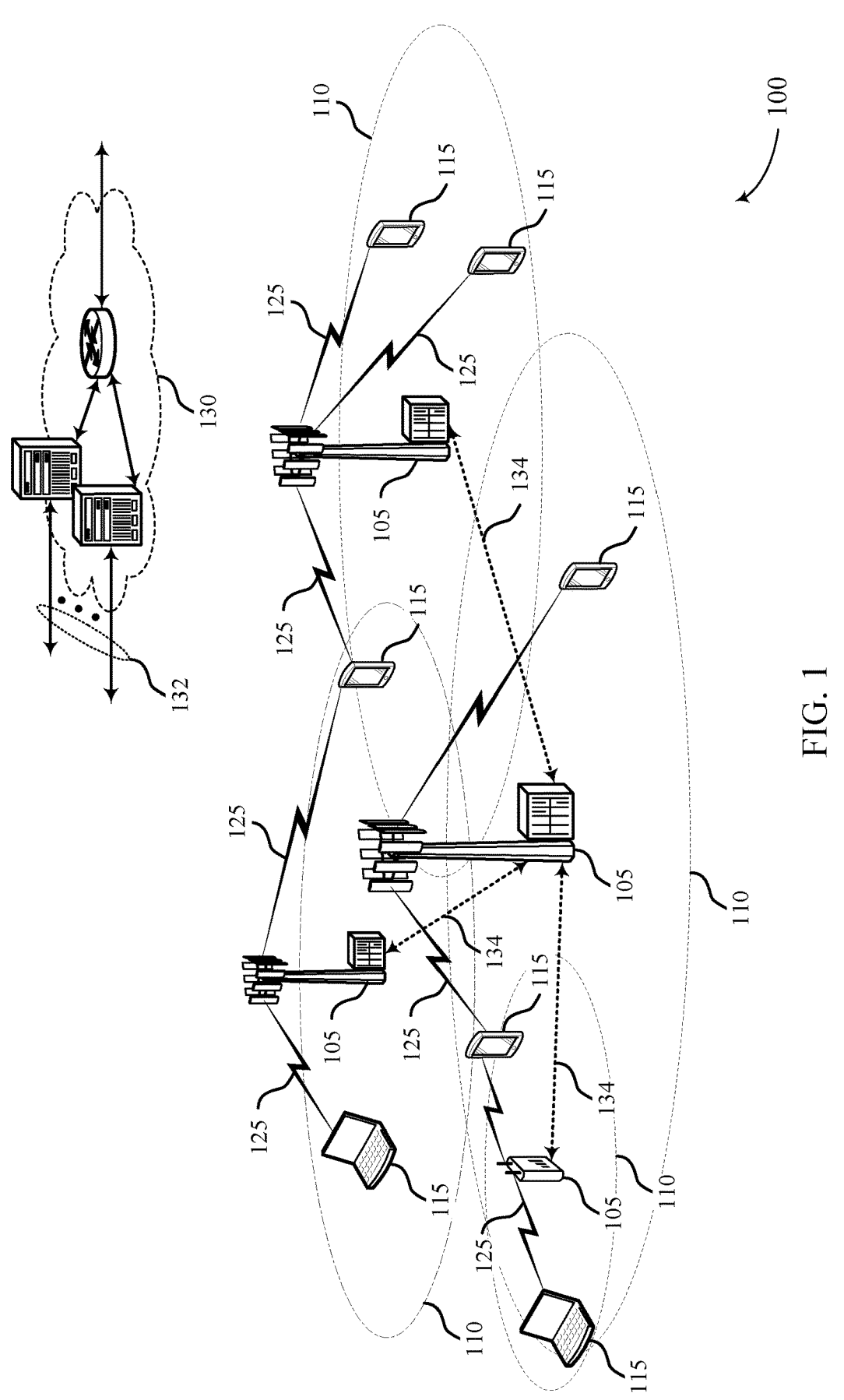
FIG. 1 illustrates an example of a system for wireless communication that supports power savings in accordance with aspects of the present disclosure.

In a wireless communication system, a user equipment (UE) may analyze resources of an established network connectivity and initiate procedure to implement a dormancy state at the UE, as a means to conserve power, for example available power of a battery. An application processor may evaluate a power state of the UE and correlate the indicated state to a preconfigured threshold. In the case of operable power capacity below the threshold, the application processor may transmit an indication of the power status to a modem of the UE. The modem may receive the indication over a binary protocol interface of the UE (e.g., a mobile station modem (MSM) interface) and enact command instructions associated with the protocol. The modem may analyze resources of the one or more channels configured for data transmission and reception, as well as the scheduling operation at the UE, and determine an absence of signaling associated with the UE.

Upon determining signaling inactivity at the processor, the UE may transmit a distinct connection suspend request message to the base station for at least acknowledgment and confirmation of a dormancy state at the UE. The request may correspond to a single bit or multi bit command indication soliciting a switch to a power saving mode (e.g., dormancy state) at the UE. In some cases, the UE may signal the connection suspend request via an UL dedicated control channel (DCCH) transmission over a configured signaling radio bearer (SRB) 1. In other cases, the UE may implement a distinct bit string (e.g., medium access control (MAC) control element (CE)) to carry control indication of the request. The MAC CE may be implemented within one or more sub-headers of a submitted MAC protocol data unit (PDU). Alternatively, in other cases, the UE may map the one or more bits of the connection suspend request within an uplink control information (UCI) indication on physical layer (PHY) resources. The request may be mapped to one or more configured resource elements of allocated resource blocks within physical uplink control channel (PUCCH) and/or physical uplink shared channel (PUSCH) resources. In each of the aforementioned cases, the request indication for enacting dormancy procedure at the UE may enable at least a method for sustaining synchronization between the base station and the UE and preserving available power.

The base station may receive the transmitted signaling and/or submitted indication of the UE and compose a response to the connection suspend request. In some cases, the composed response may include a positive acknowledgment of the dormancy state request of the UE, and confirmation for subsequent enablement of a power saving mode at the UE. In other cases, the composed response may include a connection suspend rejection, and command indication to sustain an RRC connected state at the UE. The UE may receive the transmitted response to the connection suspend request from the base station, and determine an operation mode of the UE. In the case of a connection suspend acknowledgment and confirmation, the UE may cache security context and configuration parameters of the established connection with the base station and additional layer protocols of the data network, and enter a configured dormancy state of the UE. The dormancy state of the UE may allow the UE to operate with limited power consumption by obviating data traffic over PHY layer resources, while sustaining the established RRC connectivity with the base station.

A trigger indication from the application processes coupled to the UE and/or upper layer (e.g., NAS) request services of evolved packet core (EPC) entities may initiate connection re-establishment procedure at the UE. The UE may signal the connection suspend request via an UL dedicated control channel (DCCH) transmission over SRB 1. The base station may receive the transmitted signaling of the UE and process the command information, including the contained bit request for re-establishing data connectivity within an RRC connected state. In some cases, the base station may then respond with a connection resume confirmation message over DL DCCH resources. The UE may then implement procedure for re-enacting (re-establishing) the previously established RRC connected state of the UE, in accordance with the cached or an indicated security context of the connection. In other cases, the base station may initiate an RRC connection release procedure at the UE. As a result, the UE may transition to an RRC Idle mode on a camped cell of the network. The connection request and response of the UE and the base station may maintain synchronization between the interpreted functional mode of the UE at the base station and the implemented mode at the UE.

Aspects of the disclosure are initially described in the context of a wireless communications system. Aspects are also described in the context of signaling transmission over a configured network cell and process flows. Aspects of the disclosure are further illustrated by and described with reference to apparatus diagrams, system diagrams, and flowcharts that relate to power savings techniques through mobile initiated dormancy.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support signaling between a UE 115 and a base station that enables the UE 115 to enter into a dormancy state for efficient power saving.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300

MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Each of the UEs 115 may initiate connection establishment and synchronization to a network cell of the wireless communication system. The UEs 115 may receive broadcasted network identification (e.g., public land mobile network identity (PLMN-ID), physical cell id (PCI), etc.) and network capability indication from base stations 105 associated with the network cells, for at least time slot and frame synchronization. Based at least in part on the synchronization, the UEs 115 may be enabled to interpret received system information over system information block (SIB) and master information block (MIB) resources and establish downlink (DL) synchronization. The UEs 115 may initiate random access procedure (RAP) with the base station and establish uplink (UL) synchronization for attaining network access stratum (NAS) services. Preemptive to establishing NAS connectivity, the UEs 115 may establish radio resource control (RRC) protocol connectivity with the base stations 105 of the network via common control channel (CCCH) transmission on signaling radio bearer (SRB) 0. RRC connection establishment may include SRB 1 configuration for direct control channel (DCCH) signaling. The UEs 115 may send an NAS attach request and public data network (PDN) connectivity request for internet protocol (IP) establishment on the RRC connection. The base stations 105 may establish a logical connection associated with the respective UEs 115 at a serving mobile management entity (MME) and serving gateway (S-GW) of the core network and perform authentication. The S-GW may establish a default bearer and additional dedicated assignment for the UEs 115 to establish connectivity to the PDN and assign an IP address to the UE. The one or more bearers may contain a radio bearer connection between the base station and UE, an S1 bearer between the base stations 105 and S-GW, and a S5/S8 bearer between the S-GW and a PDN gateway (P-GW) of the network. Based on the bearer assignment, the base stations 105 may establish security parameters with the UE and IP connectivity may be established at the UEs 115.

Wireless communications system 100 may support a UE initiated dormancy state implementation at the UEs 115 as a means to at least preserve battery resources at the UEs 115. Within certain contexts (e.g., in LTE), a UE 115 may provide a detach request to a serving MME entity of the UE 115 (via NAS signaling) and perform an autonomous release of evolved packet system (EPS) connection management (ECM). The MME may then implement session termination protocols for both the S-GW and P-GW of the PDN and locally deactivate the assigned EPS bearer contexts for the UE 115, absent peer-to-peer signaling. As a result, a base station 105 of the established RRC connection may be unaware of the connection release at the UE 115. Synchronization between the UEs 115 and base stations 105 may be impeded with sustained resource overhead being dedicated between the base stations and the respective serving MMES of the UEs 115. The provided features of the present disclosure include additional methods and features for enacting distinct RRC signaling transmission and reception between the UEs 115 and base stations 105. The signaling may solicit and acknowledge dormancy state implementation at the UEs 115, while sustaining synchronous interpretation at the base stations 105 and obviating an autonomous connection release procedure at the UEs 115. An advantage of these provided features may include providing a graceful transition to a dormancy state for a UE 115 that reduces the overall signaling required between a UE 115 and a base station 105 upon reactivation or resuming the connection between the UE 115 and the base station 105.

One or more of the UEs 115 within wireless communications system 100 may include a modem and one or more configured application processors. The application processors may be coupled to the UE 115 via a command based binary protocol interface (e.g., MSM interface) and may provide indication parameters for enabling and suspending a dormancy state at the UE 115, including a power state indication (e.g., for a battery power level). For example, an application processor of a UE 115 may provide indication of a power level status below a preconfigured threshold. The modem of the of the UE 115 may evaluate one or more service operations and determine a lack of data activity over the established network connection. In accordance with the inactivity detection at the modem and the signaling indication of the coupled applications, the UEs 115 may solicit procedure for enacting a dormancy state implementation at the UEs 115, as a means to promote battery power conservation.

In some examples, each of the UEs 115 may be coupled to a network database of the EPS connection. The database may be established locally within the data hardware of each UE 115 or remotely via a link connection. The database may include static and/or dynamic memory allocation designated for each of the UEs 115. In the case of dormancy state implementation, each of the UEs 115 may cache at least security context and configuration parameterization of the PDN connectivity within an RRC connected state implementation at the UEs 115. Additional data context and authentication information corresponding to the UEs 115 may be saved at the network database by the UEs 115 or a coupled network entity (e.g., base stations 105, serving MME, HSS, etc.) of the established EPS connection.

Each of the base stations 105 may be configured to process the RRC signaling messages of the UEs 115, in relation to dormancy state initialization and suspension requests. The signaling messages may contain bit indication values for operation mode implementation at the UEs 115. The base stations 105 may evaluate the context of at least the established RRC connection and compose a response acknowledgment or rejection through distinct RRC signaling. The response acknowledgement or rejection of the base station may maintain synchronization between the interpreted functional mode of the UEs 115 at the base stations 105 and the implemented mode at the UEs 115. In some examples, each of the base stations 105 may be configured to process Layer 1 signaling messages of the UEs 115, in relation to dormancy state initialization and suspension requests. An advantage of utilizing Layer 1 signaling may include enabling a quicker communication mechanism for requests and responses between a base station 105 and UE 115 as compared to RRC signaling.

Figure 2:
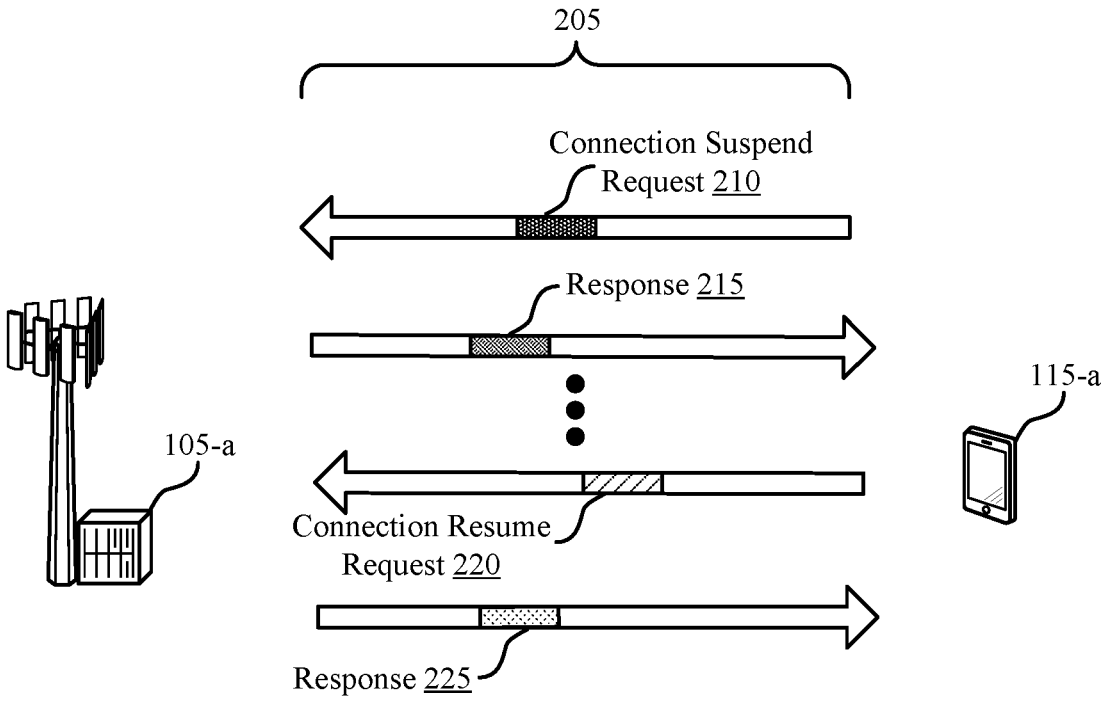
FIG. 2 illustrates an example of a wireless communications system that supports power savings in accordance with aspects of the present disclosure.

FIG. 2 illustrates an example of a wireless communications system 200 that supports power savings (e.g., through mobile initiated dormancy) in accordance with various aspects of the present disclosure. Wireless communications system 200 may be representative of at least a sub-context of an established EPS. In some examples, wireless communications system 200 may implement aspects of wireless communications system 100. For instance, wireless communications system 200 includes UE 115-*a* and base station 105-*a*, which may be examples of the corresponding devices described with reference to FIG. 1. Wireless communications system 200 may support efficient battery conservation at a UE 115 through coherent signaling used to transition to and from a dormancy state.

UE 115-*a* may be synchronized with base station 105-*a* and camped on a configured network cell of the EPS connection. UE 115-*a* may have an established RRC connection with base station 105-*a* and may be configured to receive and transmit information 205 over licensed and unlicensed (shared) radio frequency spectrum band resources. Additional bearer contexts may be allocated to UE 115-*a* as part of PDN connectivity, to establish end-to-end connectivity between UE 115-*a* and the P-GW of the service network.

One or more application processors may be coupled to UE 115-*a*, as a means to at least detect parameterization values associated with functional components and/or operable status at UE 115-*a*. For example, an application processor may evaluate a battery power state of UE 115-*a*, and determine the operable battery capacity is below a configured power threshold. The application may transmit an indication of the battery status to a modem of UE 115-*a*, via a configured MSM interface of UE 115-*a*, and enact command instructions associated with one or more protocols of the interface. The modem may interpret the received indication of the application, and analyze the configured channels of the established connection as well as the scheduling operation at UE 115-*a*. Based on the analysis, the modem may determine an absence of signaling communication at the UE 115-*a* in accordance with the established network connection. In some cases, the modem may implement a timing duration for determining the signaling absence. The timing may be configured according to the EPC mobile management entity (MME) sublayer of the network access stratum (NAS) protocol and may be based at least in part on the bearer assignment (e.g., EPS bearer) of the packet data network (PDN) connectivity establishment as well as the configured protocols of the RRC connection establishment.

Following the signaling inactivity determination of the modem, UE 115-*a* may transmit a distinct connection suspend request 210 to base station 105-*a* for at least acknowledgment and confirmation of a dormancy state implementation at UE 115-*a*. Connection suspend request 210 may correspond to a single bit command indication soliciting a switch to a power saving mode (e.g., dormancy state) at UE 115-*a*, and may include one or more additional bit indicators corresponding to a priority indication and/or enactment duration of the dormancy state. In some cases, UE 115-*a* may signal the connection suspend request via UL DCCH resources over SRB 1 configured between base station 105-*a* and UE 115-*a*. For example, UE 115-*a* may configure a bit indication within a field structure of a distinct UL DCCH message indication. The bit indication may have a designated numerical or boolean value representative of a dormancy state request. Additionally, UE 115-*a* may include one or more additional bit value indicators within the request message, as a means to indicate priority and/or duration values associated with the dormancy state request. UE 115-*a* may include spare bits within the field structure of the DCCH mapping for the purpose of padding to octet boundaries (e.g., octet aligned) of the message indication, and for ensuring forward capability on DCCH resources.

In other cases, UE 115-*a* may implement a distinct bit string (e.g., MAC CE) within a MAC PDU for control indication regarding the request for control command exchange between UE 115-*a* and base station 105-*a*. For example, UE 115-*a* may submit a DL MAC PDU to base station 105-*a* to convey control and data indication, including a request to enact a dormancy state at UE 115-*a*, within one or more concatenated MAC inputs. The MAC CE may span a fixed number of bits (e.g., the MAC CE may be a fixed size), and may be allocated a unique logical channel ID (LCD) bit string contained within a MAC subheader. The field structure of the indicated MAC CE may be structured according to CCs of the channel, in association with enabled CA implementation at the UE 115-*a*. Specifically, UE 115-*a* may provide a bit indication within the MAC CE according to each CC of the channel. The payload of the MAC CE indicated by UE 115-*a* may include additional reserved bit elements mapped within the field structure of the MAC CE, as a means to indicate priority and/or duration values (e.g., indicating how long the UE will need or would like to be in the dormancy state) associated with the dormancy state request. For example, UE 115-*a* may configure a unique, 8 bit MAC CE to request dormancy state implementation at the UE 115-*a*. UE 115-*a* may allocate the MAC CE within a subheader of a DL MAC PDU, and define the field structure of the one or more contained bits of the MAC CE according to at least CA properties of the channel. In the case of 4 CCs spanning the CA bandwidth of the channel, UE 115-*a* may define the field mapping within the MAC CE for each of the 4 bits corresponding to the CCs. UE 115-*a* may reserve the additional 4 bits of the MAC CE as a means to ensure padding to octet boundaries (e.g., octet alignment) within the field mapping of the MAC CE, and therefore ensure forward capability within the MAC PDU. In some cases, the additional reserve bits of the MAC CE may contain priority and/or duration indication regarding the requested dormancy state implementation at UE 115-*a*.

Alternatively, in additional cases, UE 115-*a* may map the one or more comprised bits associated with the connection suspend request within UCI resources of an UL data transmission over PDCCH and/or PUSCH resources. Specifically, UE 115-*a* may configure a bit indication within the reserved UCI mapping on allocated resource blocks scheduled for UL data transmission. The bit indication may have a designated numerical or boolean value representative of at least a request for dormancy state initialization or suspension. For example, UE 115-*a* may configure the bit indication of the UCI to a bit value of 1 for the connection suspend request. UE 115-*a* may include one or more additional allocated bits within the UCI mapping, as a means to indicate priority and/or duration values associated with the dormancy state request. In some cases, UE 115-*a* may time multiplex one or more demodulation reference signal (DMRS) symbols within the allocated resource blocks of the transmission, and sustain contiguous signaling despite frequency diversity. UE 115-*a* may orient the UCI, including the configured bit indication of the connection suspend request to resource elements proximal to the multiplexed DMRS symbols of the allocated resource blocks, for at least channel indication reliability and data acknowledgement.

Base station 105-*a* may receive the one or more of the aforementioned signaling indications of the connection suspend request 210 from UE 115-*a*, including the contained bit request for enacting a dormancy state at UE 115-*a*. Base station 105-*a* may process and interpret the contained command indication of the message payload and evaluate the context of at least the established RRC connection with UE 115-*a*. Based at least in part on the interpretation and evaluation, base station 105-*a* may compose a response 215 to the connection suspend request. Base station 105-*a* may signal response 215 via DCCH resources over SRB 1. In some cases, base station 105-*a* may compose a response transmission containing a positive acknowledgement of the dormancy state request of UE 115-*a*, as well as confirmation for subsequent enablement of the dormancy state. Alternatively, base station 105-*a* may compose a response transmission including a connection suspend rejection associated with the RRC context of UE 115-*a*. The suspend rejection may include additional command instructions to sustain an RRC connected state at UE 115-*a*. The response acknowledgement or rejection of base station 105-*a*, in correspondence with the reception of the distinct connection suspend request message of UE 115-*a*, may maintain synchronization between the interpreted functional mode of UE 115-*a* at base station 105-*a* and the subsequently implemented mode at UE 115-*a*.

UE 115-*a* may receive, from base station 105-*a*, the transmitted response 215 and determine a mode of operation in accordance with the submitted command indication. In the case of a connection suspend acknowledgment and confirmation message, UE 115-*a* may cache one or more security context and/or configuration parameters of the established RRC connection with base station 105-*a* and additional bearer connections of the data network. In addition, based at least in part on the connection suspension confirmation of base station 105-*a*, UE 115-*a* may enter a configured dormancy state. In some cases, the caching operation of UE 115-*a* may include storing the aforementioned context parameters of the connection within static and/or dynamically allocated data storage of a database coupled to UE 115-*a*. The database may be locally oriented within the hardware of UE 115-*a*, or may be remotely coupled to UE 115-*a* via an application processor and/or device interface. Additionally or alternatively, additional storage resources may be deployed at the packet data network gateway (P-GW) and/or serving gateway (e.g., Layer 2 caching) elements of the PDN and in association with UE 115-*a*, or within available resources at base station 105-*a* (e.g., Layer 1 caching). The implemented dormancy state at UE 115-*a* may allow UE 115-*a* to operate with limited power consumption by obviating data traffic over PHY layer resources, while sustaining RRC connectivity establishment with base station 105-*a*. Alternatively, in the case of a connection suspend rejection message, UE 115-*a* may sustain an RRC connected state of UE 115-*a* and permit continued data transaction with base station 105-*a*. In some cases, the connection suspend rejection message may include a timing offset indication within the message payload. Based at least in part on the offset parameter, UE 115-*a* may ignore one or more data inactivity detections at the modem or device status indications of the one or more configured application processors associated with UE 115-*a*, over the specified duration.

UE 115-*a* may receive a trigger indication over the MSM interface via one or more coupled application processors configured to UE 115-*a*, and/or via upper layer (NAS) request services of the EPS. The trigger may include one or more indications for data connection re-establishment at UE 115-*a*. The modem of UE 115-*a* may process the application processor indication or the encapsulated short message service (SMS) entity transport of the upper layer request, and configure a connection resume request 220 to base station 105-*a*. UE 115-*a* may signal connection resume request 220 via UL DCCH resources over SRB 1 configured between base station 105-*a* and UE 115-*a*. For example, UE 115-*a* may configure a bit indication within a field structure of a distinct UL DCCH message indication. The bit indication may have a designated numerical or boolean value representative of a connection (e.g., RRC connected state) resume request. For example, UE 115-*a* may configure the bit indication of the UCI to a bit value of 0 for the connection resume request Additionally, UE 115-*a* may include one or more additional bit value indicators within the request message, as a means to indicate priority and/or duration values associated with the connection resume request. UE 115-*a* may include spare bits within the field structure of the DCCH mapping for the purpose of padding to octet boundaries (e.g., octet aligned) of the message indication, and for ensuring forward capability on DCCH resources.

Base station 105-*a* may receive one or more of the aforementioned connection resume request signaling indications of the connection resume request 220, including the contained bit request for re-establishing data connectivity via an RRC connected configuration at UE 115-*a*. Base station 105-*a* may process and interpret the contained command indication of the message payload and evaluate the context of the established PDN connection. Based at least in part on the indication and evaluation, base station 105-*a* may transmit a response 225 to the connection resume request, over DL DCCH resources.

In some cases, base station 105-*a* may respond via a distinct connection resume confirmation message over SRB 1. Within the payload of the resume confirmation message, base station 105-*a* may provide command instructions for instituting the cached security context and dedicated parameters of the established network connectivity. Alternatively, base station 105-*a* may present a new security context and dedicated parameters of the connection within the payload of the connection resume confirmation message. Each of the security context and dedicated connection parameters may be configured within the field structure of the DCCH message indication. UE 115-*a* may then implement procedure for re-enacting the previously established RRC connected state of UE 115-*a*, in accordance with either the cached or newly indicated parameters.

In other cases, base station 105-*a* may initiate an RRC connection release procedure corresponding to UE 115-*a*. Specifically, base station 105-*a* may provide a context release request to the serving MME of UE 115-*a*, via the S1-MME interface. The MME may enact procedure to tear down the EPS bearers of the established connection at UE 115-*a*, via communication with the S-GW. Based at least in part on the bearer release, the RRC connection of UE 115-*a* may be terminated, and base station 105-*a* may provide an RRC connection release indication to UE 115-*a*. As a result, UE 115-*a* may transition to an RRC Idle mode on a camped cell of the network. The response acknowledgement or rejection of base station 105-*a*, in correspondence with the reception of the distinct connection resume request message of UE 115-*a*, may maintain synchronization between the interpreted functional mode of UE 115-*a* at base station 105-*a* and the implemented mode at UE 115-*a*.

Figure 3:
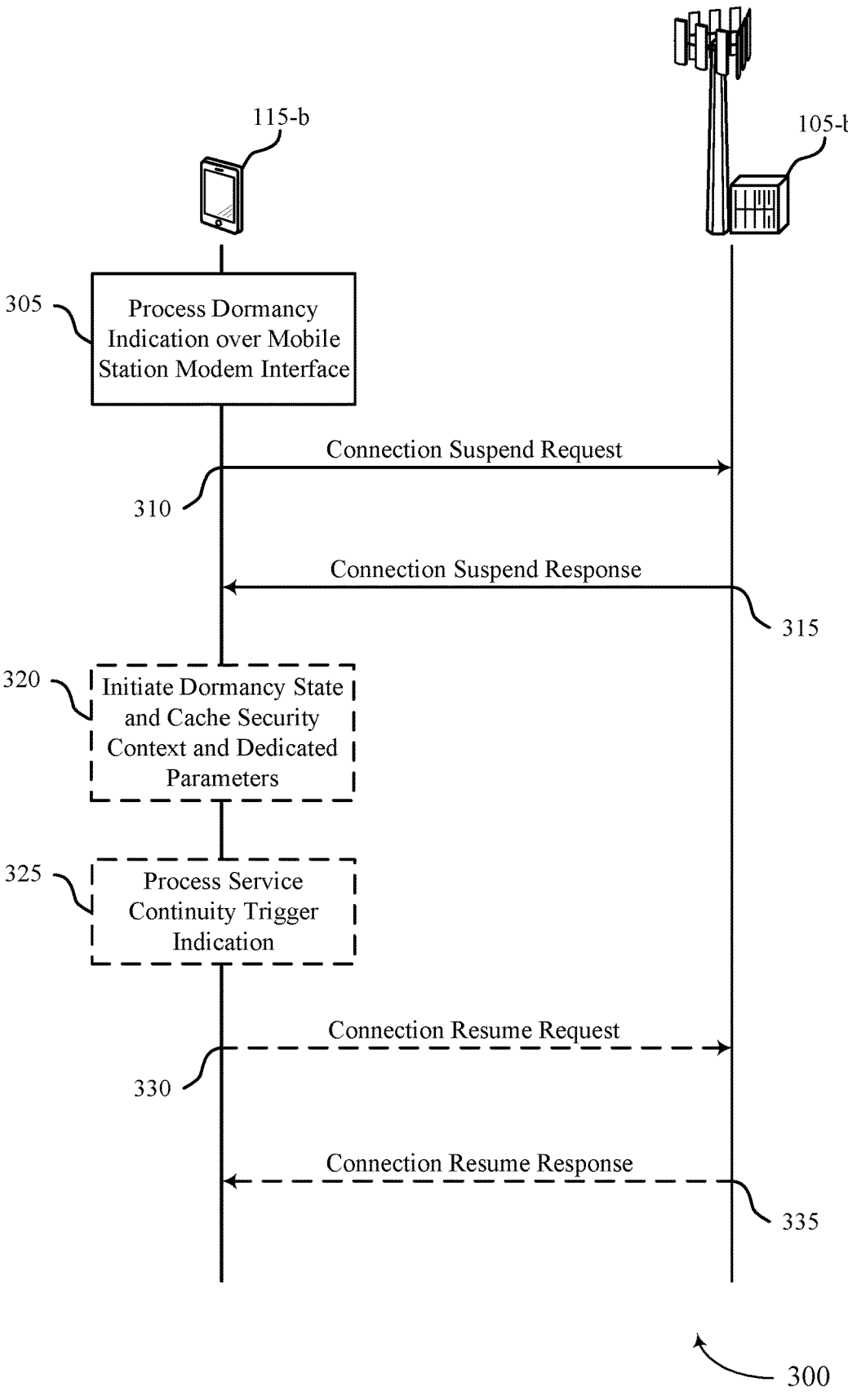
FIG. 3 illustrates an example of a process flow in a system that supports power savings in accordance with aspects of the present disclosure.

FIG. 3 illustrates an example of a process flow 300 in a system that supports power savings (e.g., through mobile initiated dormancy) in accordance with various aspects of the present disclosure. In some examples, process flow 300 may implement aspects of wireless communications system 100. For example, process flow 300 includes UE 115-*b* and base station 105-*b*, which may be examples of the corresponding devices described with reference to FIGS. 1 and 2. Process flow 300 may support maintained synchronization between UE 115-*b* and base station 105-*b* following a transition to a dormancy state by UE 115-*b*. Additionally, the transition to the dormancy state may be preemptively requested by UE 115-*b*, where base station 105-*b* may respond with a confirmation or denial of the requested transition.

At 305, a modem of UE 115-*b* may process received signaling indication and command instructions corresponding to a battery status of UE 115-*b*. The signaling may be directed from a coupled application processor of UE 115-*b* and may be received over an MSM interface context of UE 115-*b*. The modem may interpret the received command instructions of the application, and analyze sources of the configured channels of the established connection as well as the scheduling operation at UE 115-*b*. Based at least in part on the analysis, the modem may determine an absence of data transaction at UE 115-*b*. In some examples, the modem of UE 115-*b* or another component of UE 115-*b* may process received signaling indication and command instructions corresponding to an aspect of UE 115.*b* other than a battery status of UE 115-*b* for determining to transition to the dormancy state. For example, the UE 115-*b* may determine to transition to the dormancy state based on processing resources and associated UE 115-*b* activities or applications that do not require an active connection to base station 105-*b* irrespective of a battery status.

Following the determination at the modem, UE 115-*b* may transmit a connection suspend request message 310 to base station 105-*b*. The request message may correspond to a single bit command indication soliciting a switch to a power saving mode (e.g., dormancy state) at UE 115-*a*, and may include one or more additional bit indicators corresponding to a priority indication and/or enactment duration of the dormancy state. In some cases, UE 115-*b* may signal the connection suspend request to base station 105-*b* via an UL dedicated control channel (DCCH) transmission over signaling radio bearer (SRB) 1, configured during RRC connection establishment. In other cases, UE 115-*b* may implement a distinct bit string (e.g., medium access control (MAC) control element (CE)) to carry control indication of the request for control command exchange between UE 115-*b* and base station 105-*b* over MAC layer protocols. Alternatively, in other cases, UE 115-*b* may map the one or more comprised bits of the connection suspend request in alignment with uplink control information (UCI) indication on PHY resources. The request may be mapped to one or more configured resource elements of allocated resource blocks within physical uplink control channel (PUCCH) and/or physical uplink shared channel (PUSCH) resources.

Base station 105-*b* may receive the transmitted signaling and/or submitting indication of the connection suspend request message 310, including the contained bit value corresponding to a request for enacting a dormancy state at UE 115-*b*. Base station 105-*b* may evaluate the context of at least the established RRC connection with UE 115-*b* and transmit a response message 315 to the connection suspend request over DL DCCH resources. Response message 315 may include a positive acknowledgment of the dormancy state request of UE 115-*b* and confirmation for subsequent enablement of a power saving mode at UE 115-*b*. Accordingly, the base station 105-*b* may initiate a transition to a dormancy state with UE 115-*b* prior to expiration of an inactivity timer.

At 320, UE 115-*b* may receive from base station 105-*b* the transmitted response message 315 and enter a configured dormancy state of UE 115-*b*. UE 115-*b* may enact the operational state change at UE 115-*b* in accordance with the submitted command indication of response message 315, including the acknowledgement and confirmation of dormancy state implementation at UE 115-*b*. UE 115-*b* may cache, within a coupled database of the wireless system, security context and configuration parameters of the established RRC connection with base station 105-*b* and additional layer protocols of the established network connection.

At 325, UE 115-*b* may process a trigger indication from the one or more coupled application processors of UE 115-*b* and/or upper layer (e.g., NAS) request services of EPC entities. The trigger indication may initiate connection re-establishment procedure at UE 115-*b*. UE 115-*b* may transmit a connection resume request message 330 via DL DCCH resources over SRB 1. The connection resume request message may be a single or multi-bit indication within the bit field structure comprising the DCCH transmission.

Base station 105-*b* may receive the transmitted connection resume request message 330 and process the command information contained within connection resume request message 330, including the contained bit request for re-establishing an RRC connected state at UE 115-*b*. Base station 105-*b* may then respond with a connection resume response message 335. In some cases, connection resume response message 335 may entail an RRC connected state re-establishment confirmation. Within the message payload corresponding to the resume confirmation, base station 105-*b* may provide command instructions for instituting the cached security context and dedicated parameters of the established network connectivity or present a new security context and dedicated parameters of the connection. Alternatively, base station 105-*b* may initiate an RRC connection release procedure at UE 115-*b*, and connection resume response message 335 may entail an RRC connection release indication for UE 115-*b*.

Figure 4:
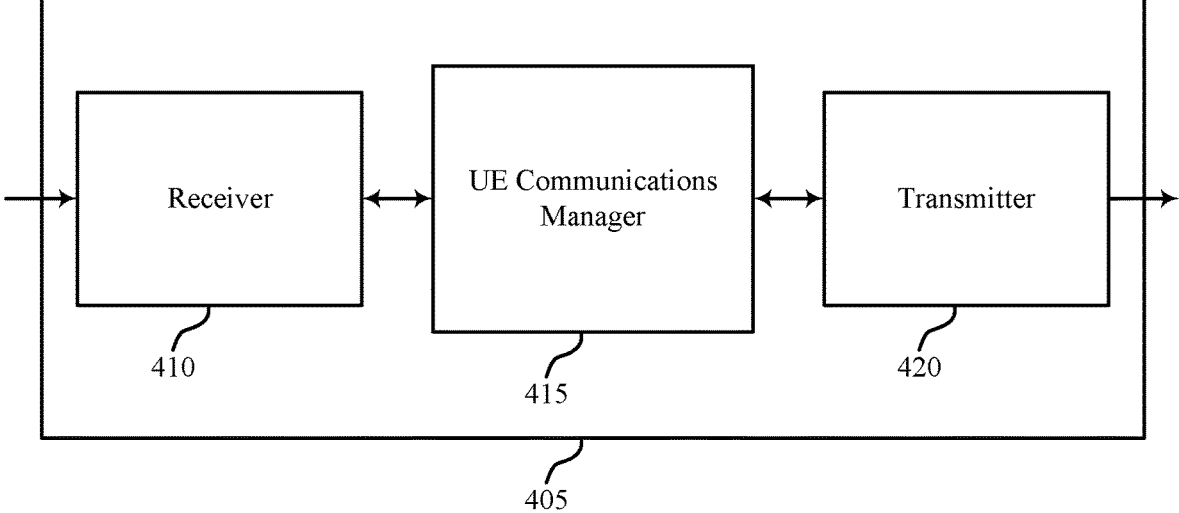
FIGS. 4 through 6 show block diagrams of a device that supports power savings in accordance with aspects of the present disclosure.

FIG. 4 shows a block diagram 400 of a wireless device 405 that supports power savings (e.g., through mobile initiated dormancy) in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to enhanced power savings through mobile initiated dormancy, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may identify that a power level of a UE 115 is below a power threshold (e.g., a predetermined power threshold), transmit a connection suspend request to a base station based on the identification, the connection suspend request to transition the UE 115 from a connected state to a dormancy state, and receive, from the base station, a response to the connection suspend request indicating whether the UE 115 is to transition to the dormancy state.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
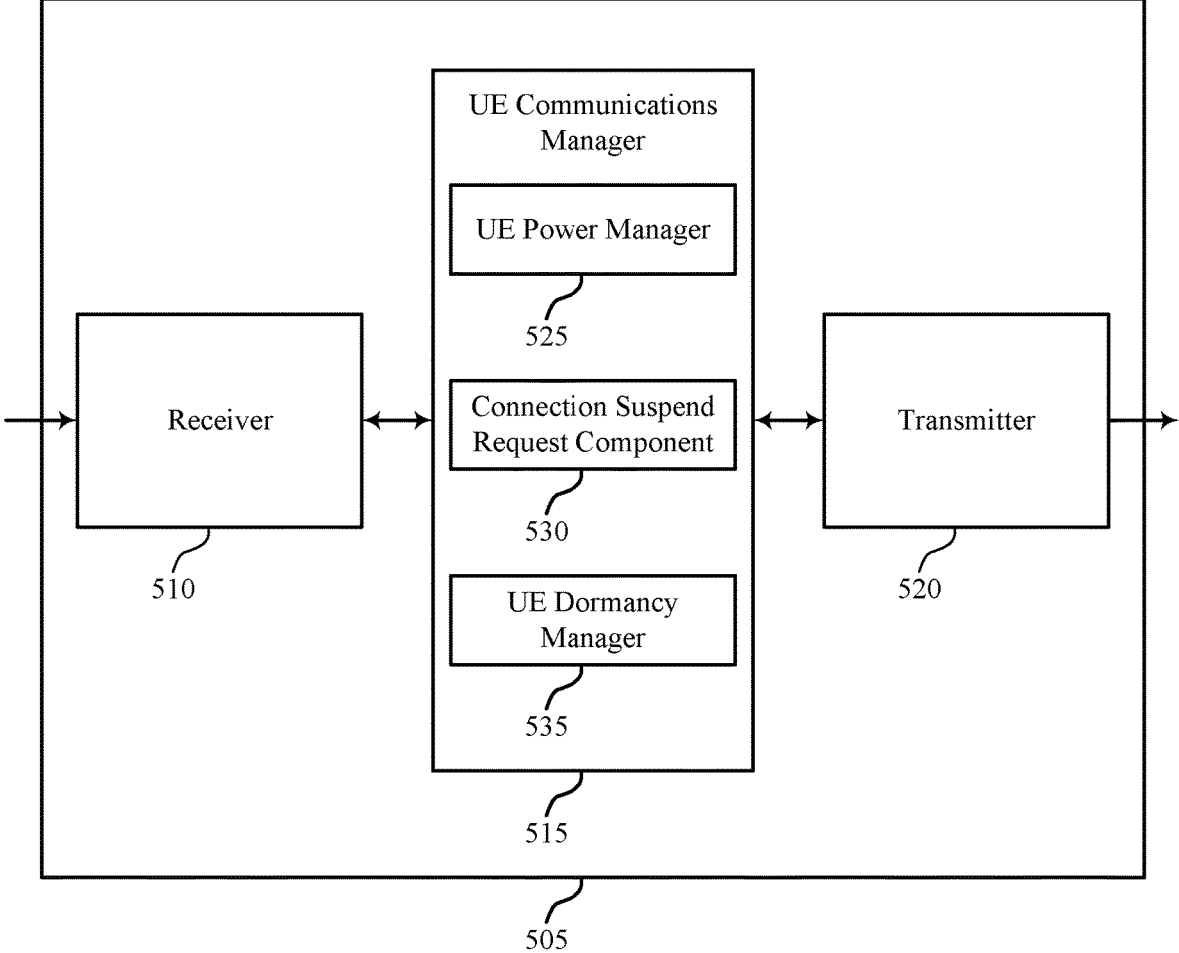

FIG. 5 shows a block diagram 500 of a wireless device 505 that supports power savings (e.g., through mobile initiated dormancy) in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to enhanced power savings through mobile initiated dormancy, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include UE power manager 525, connection suspend request component 530, and UE dormancy manager 535.

UE power manager 525 may identify that a power level of a UE 115 is below a power threshold (e.g., a predetermined power threshold). For example, UE power manager 525 may identify that a battery level or other available power level for a power source of the UE 115 is below a threshold power level. Connection suspend request component 530 may transmit a connection suspend request to a base station based on the identification, the connection suspend request to transition the UE 115 from a connected state to a dormancy state. In some cases, the connection suspend request includes an indication of a duration for the dormancy state, or a priority for the transition to the dormancy state, or a request to store a security context for the UE 115, or a request to store one or more connection parameters for the UE 115, or a combination thereof. In some cases, the connection suspend request includes an uplink DCCH message.

UE dormancy manager 535 may receive, from the base station 105, a response to the connection suspend request indicating whether the UE 115 is to transition to the dormancy state. In some examples, the UE dormancy manager 535 may determine whether to transition to the dormancy state based on the received response to the connection suspend request. In other examples, the UE dormancy manager 535 may enter a modem of the UE 115 into the dormancy state (i.e., cause the modem of the UE 115 to enter into the dormancy state), where the response includes a confirmation of the connection suspend request. In some examples, the UE dormancy manager 535 may determine, while in the dormancy state, to resume communications with the base station, and receive, from the base station, a response to the connection resume request confirming the connection resume request. In some cases, the response to the connection suspend request includes a downlink DCCH message. In some cases, the connection suspend request, or the response to the connection suspend request, or a connection resume request, or a response to the connection resume request are sent using an RRC message, or Layer 1 signaling, or a combination thereof. In some cases, the Layer 1 signaling includes uplink control information within a PUCCH, or UCI within a PUSCH, or an uplink MAC CE, or a combination thereof.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
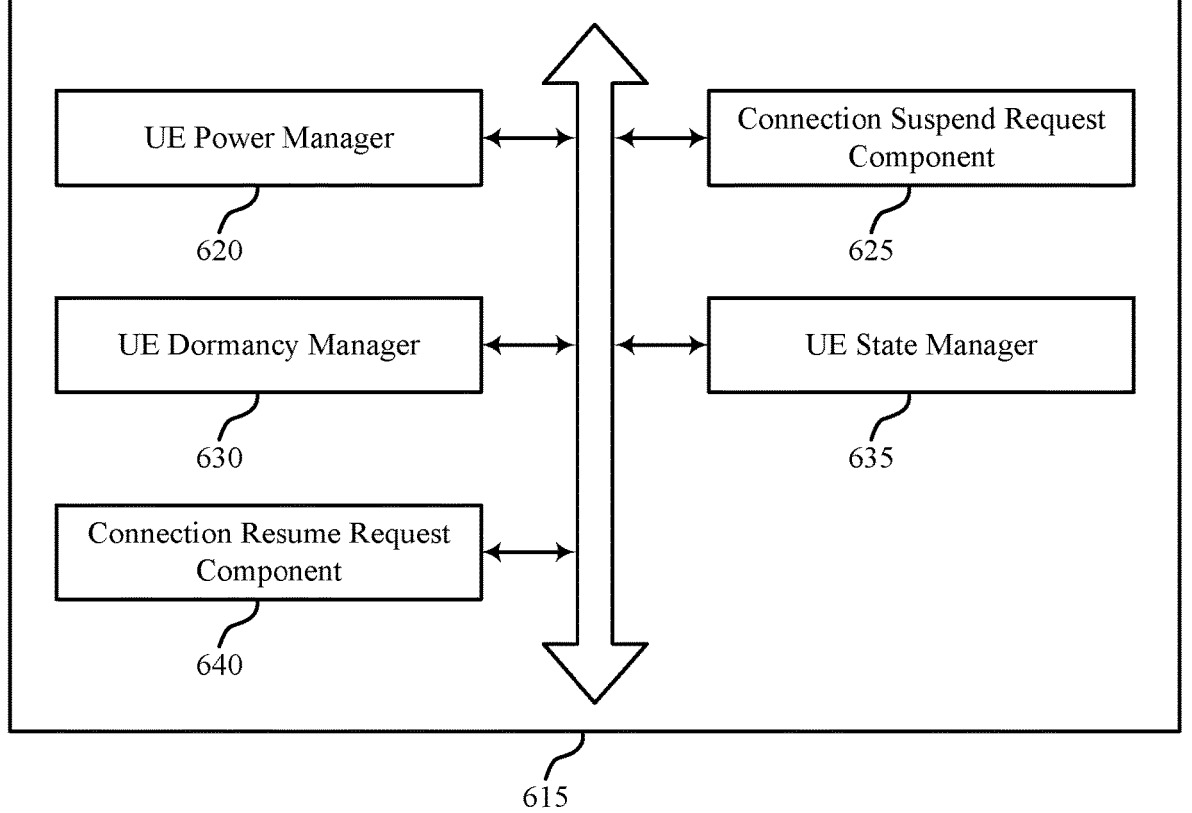
Figure 6:

FIG. 6 shows a block diagram 600 of a UE communications manager 615 that supports power savings (e.g., through mobile initiated dormancy) in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include UE power manager 620, connection suspend request component 625, UE dormancy manager 630, UE state manager 635, and connection resume request component 640. Each of these modules may communicate, directly or indirectly, with one another (e.g., via one or more buses).

UE power manager 620 may identify that a power level of a UE 115 is below a power threshold. Connection suspend request component 625 may transmit a connection suspend request to a base station based on the identification, the connection suspend request to transition the UE 115 from a connected state to a dormancy state. In some cases, the connection suspend request includes an indication of a duration for the dormancy state, or a priority for the transition to the dormancy state, or a request to store a security context for the UE 115, or a request to store one or more connection parameters for the UE 115, or a combination thereof. In some cases, the connection suspend request includes an uplink DCCH message.

UE dormancy manager 630 may receive, from the base station 105, a response to the connection suspend request indicating whether the UE 115 is to transition to the dormancy state. In some examples, UE dormancy manager 630 may determine whether to transition to the dormancy state based on the received response to the connection suspend request. In some cases, UE dormancy manager 630 may enter a modem of the UE 115 into the dormancy state (i.e., cause the modem of the UE 115 to enter into the dormancy state), where the response includes a confirmation of the connection suspend request. In some examples, UE dormancy manager 630 may determine, while in the dormancy state, to resume communications with the base station 105, and receive, from the base station 105, a response to the connection resume request confirming the connection resume request. In some cases, the response to the connection suspend request includes a downlink DCCH message.

UE state manager 635 may transition from the connected state to the dormancy state based on the response to the connection suspend request, where the response includes a confirmation of the connection suspend request. Alternatively, UE state manager 635 may maintain the connected state based on the response to the connection suspend request, where the response includes a denial of the connection suspend request. In some examples, UE state manager 635 may transition to an idle state based on the response to the connection suspend request, where the response includes a denial of the connection suspend request. In some examples, UE state manager 635 may transition from the connected state to the dormancy state based on the response to the connection suspend request, and transition from the dormancy state to the connected state based on the confirmation of a connection resume request.

Connection resume request component 640 may transmit, to the base station 105, a connection resume request to transition from the dormancy state to the connected state. In some cases, the connection suspend request, or the response to the connection suspend request, or a connection resume request, or a response to the connection resume request are sent using an RRC message, or Layer 1 signaling, or a combination thereof. In some cases, the Layer 1 signaling includes uplink control information within a PUCCH, or the uplink control information within a PUSCH, or an uplink MAC CE, or a combination thereof.

Figure 7:
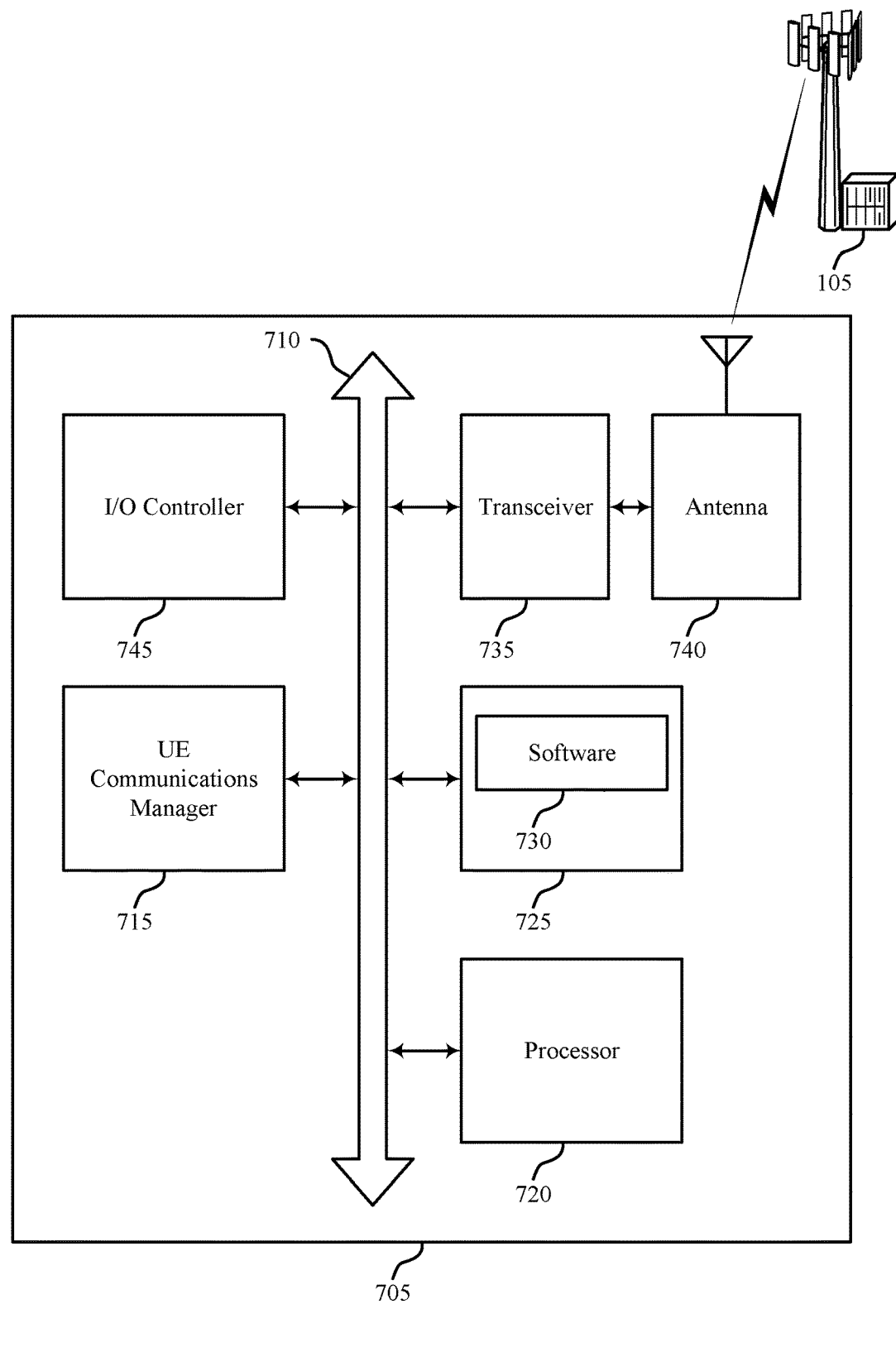
FIG. 7 illustrates a block diagram of a system including a UE that supports power savings in accordance with aspects of the present disclosure.

FIG. 7 illustrates a block diagram of a system 700 including a device 705 that supports power savings (e.g., through mobile initiated dormancy) in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting enhanced power savings through mobile initiated dormancy).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support enhanced power savings through mobile initiated dormancy. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
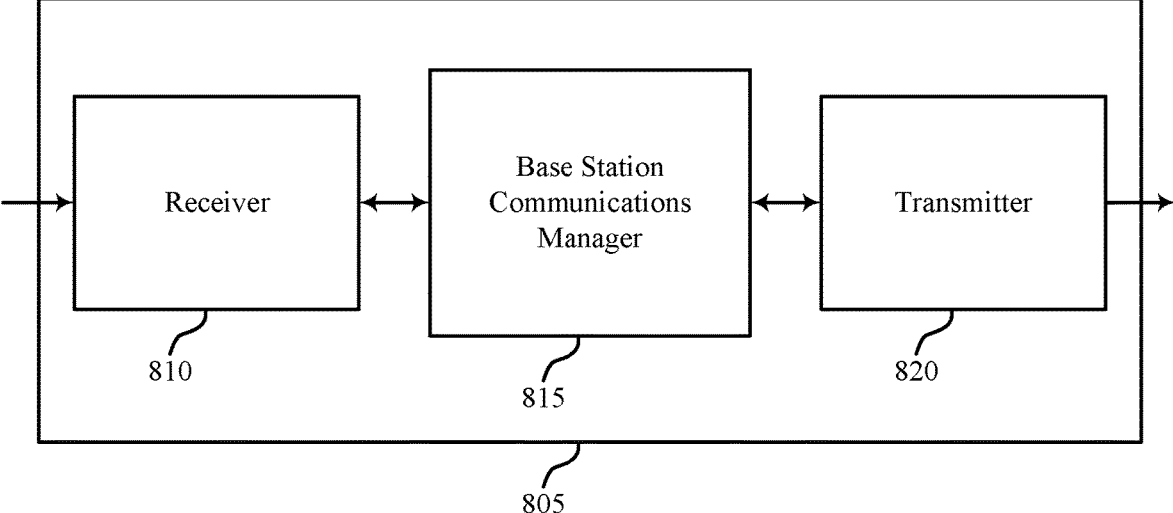
FIGS. 8 through 10 show block diagrams of a device that supports power savings in accordance with aspects of the present disclosure.

FIG. 8 shows a block diagram 800 of a wireless device 805 that supports power savings (e.g., through mobile initiated dormancy) in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to enhanced power savings through mobile initiated dormancy, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may receive a connection suspend request from a UE 115, the connection suspend request to transition the UE 115 from a connected state to a dormancy state, determine whether to allow the UE 115 to transition to the dormancy state based on the connection suspend request, and transmit a response to the connection suspend request to the UE 115, the response including, based on the determination, a confirmation of the connection suspend request or a denial of the connection suspend request.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
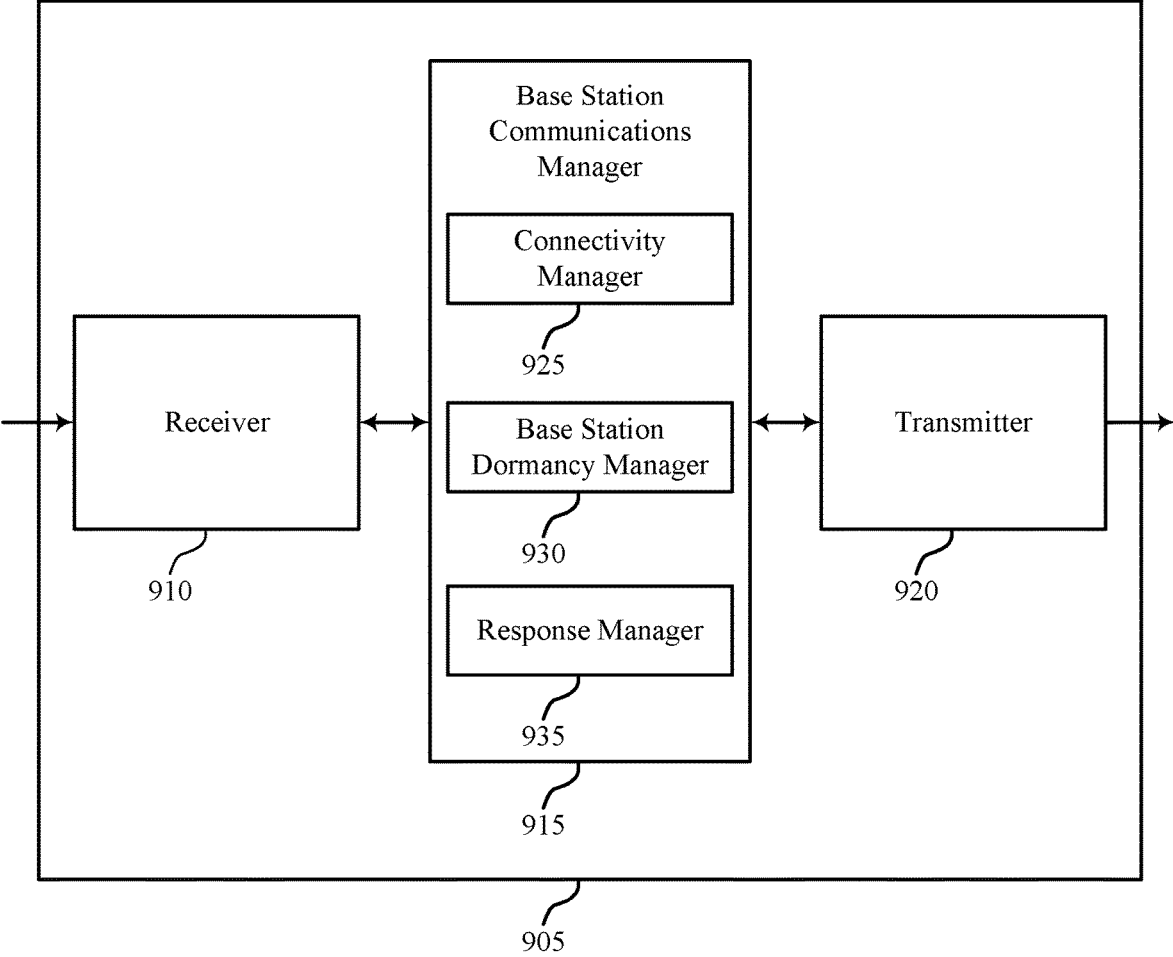

FIG. 9 shows a block diagram 900 of a wireless device 905 that supports power savings (e.g., through mobile initiated dormancy) in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to enhanced power savings through mobile initiated dormancy, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include connectivity manager 925, base station dormancy manager 930, and response manager 935.

Connectivity manager 925 may receive a connection suspend request from a UE 115, the connection suspend request to transition the UE 115 from a connected state to a dormancy state. In some examples, connectivity manager 925 may determine to allow the UE 115 to transition to the dormancy state, where the response to the connection suspend request includes the confirmation of the connection suspend request. In some cases, connectivity manager 925 may receive, from the UE 115, a connection resume request to transition the UE 115 from the dormancy state to the connected state. Connectivity manager 925 may determine to deny the UE 115 to transition to the dormancy state, where the response to the connection suspend request includes the denial of the connection suspend request. In some examples, connectivity manager 925 may transmit, based on receiving the connection suspend request, a command for the UE 115 to transition to an idle state. In some cases, the connection suspend request, or the response to the connection suspend request, or a connection resume request, or a response to the connection resume request are sent using an RRC message, or Layer 1 signaling, or a combination thereof. In some cases, the Layer 1 signaling includes uplink control information within a PUCCH, or the uplink control information within a PUSCH, or an uplink MAC CE, or a combination thereof. In some cases, the connection suspend request includes an uplink DCCH message.

Base station dormancy manager 930 may identify, based on the received connection suspend request, an indication of a duration that the UE 115 will be in the dormancy state, or a priority associated with the transition to the dormancy state, or a request to cache a UE security context, or a request to cache one or more UE connection parameters, or a combination thereof and determine whether to allow the UE 115 to transition to the dormancy state based on the connection suspend request.

Response manager 935 may transmit a response to the connection suspend request to the UE, the response including, based on the determination, a confirmation of the connection suspend request, or a denial of the connection suspend request, and transmit a response to the connection resume request to the UE confirming the connection resume request. In some cases, the response to the connection suspend request includes a downlink DCCH message.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
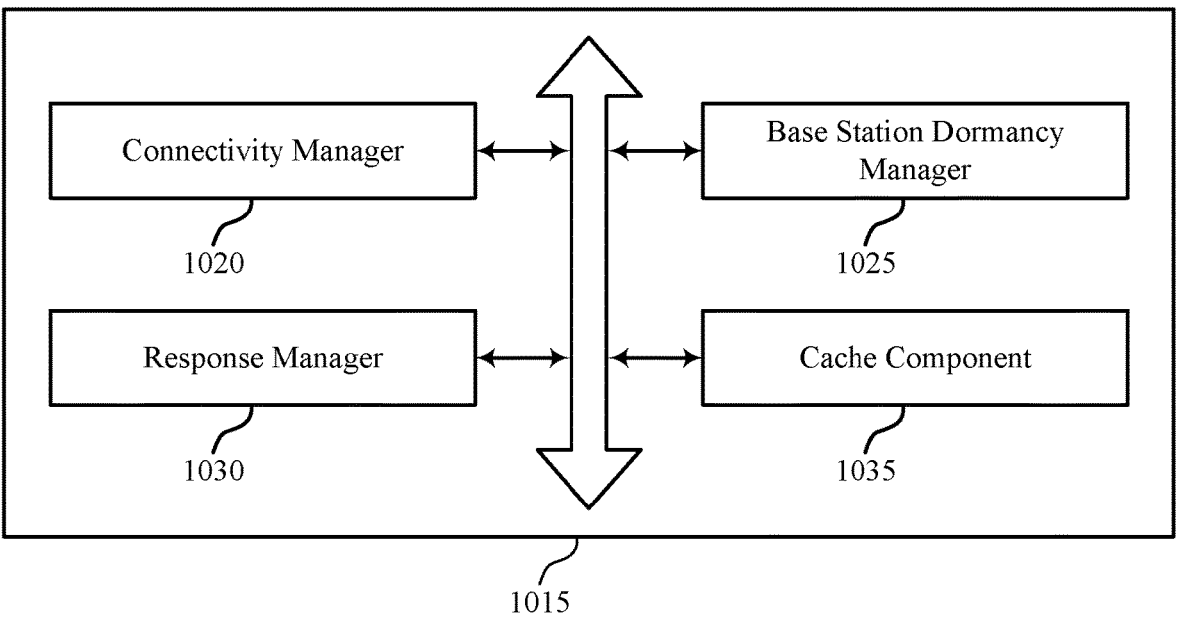
Figure 10:

FIG. 10 shows a block diagram 1000 of a base station communications manager 1015 that supports power savings (e.g., through mobile initiated dormancy) in accordance with aspects of the present disclosure. The base station communications manager 1015 may be an example of aspects of a base station communications manager 1115 described with reference to FIGS. 8, 9, and 11. The base station communications manager 1015 may include connectivity manager 1020, base station dormancy manager 1025, response manager 1030, and cache component 1035. Each of these modules may communicate, directly or indirectly, with one another (e.g., via one or more buses).

Connectivity manager 1020 may receive a connection suspend request from a UE 115, the connection suspend request to transition the UE 115 from a connected state to a dormancy state. In some examples, connectivity manager 1020 may determine to allow the UE 115 to transition to the dormancy state, where the response to the connection suspend request includes the confirmation of the connection suspend request. In some cases, connectivity manager 1020 may receive, from the UE 115, a connection resume request to transition the UE 115 from the dormancy state to the connected state. Connectivity manager 1020 may determine to deny the UE 115 to transition to the dormancy state, where the response to the connection suspend request includes the denial of the connection suspend request. In some examples, connectivity manager 1020 may transmit, based on receiving the connection suspend request, a command for the UE 115 to transition to an idle state. In some cases, the connection suspend request, or the response to the connection suspend request, or a connection resume request, or a response to the connection resume request are sent using an RRC message, or Layer 1 signaling, or a combination thereof. In some cases, the Layer 1 signaling includes uplink control information within a PUCCH, or the uplink control information within a PUSCH, or an uplink MAC CE, or a combination thereof. In some cases, the connection suspend request includes an uplink DCCH message.

Base station dormancy manager 1025 may identify, based on the received connection suspend request, an indication of a duration that the UE 115 will be in the dormancy state, or a priority associated with the transition to the dormancy state, or a request to cache a UE security context, or a request to cache one or more UE connection parameters, or a combination thereof and determine whether to allow the UE 115 to transition to the dormancy state based on the connection suspend request.

Response manager 1030 may transmit a response to the connection suspend request to the UE, the response including, based on the determination, a confirmation of the connection suspend request, or a denial of the connection suspend request, and transmit a response to the connection resume request to the UE 115 confirming the connection resume request. In some cases, the response to the connection suspend request includes a downlink DCCH message.

Cache component 1035 may store, by the base station based on receiving the connection suspend request, one or more communication parameter values for the UE. In some cases, storing the one or more communication parameter values includes storing a security context of the UE 115.

Figure 11:
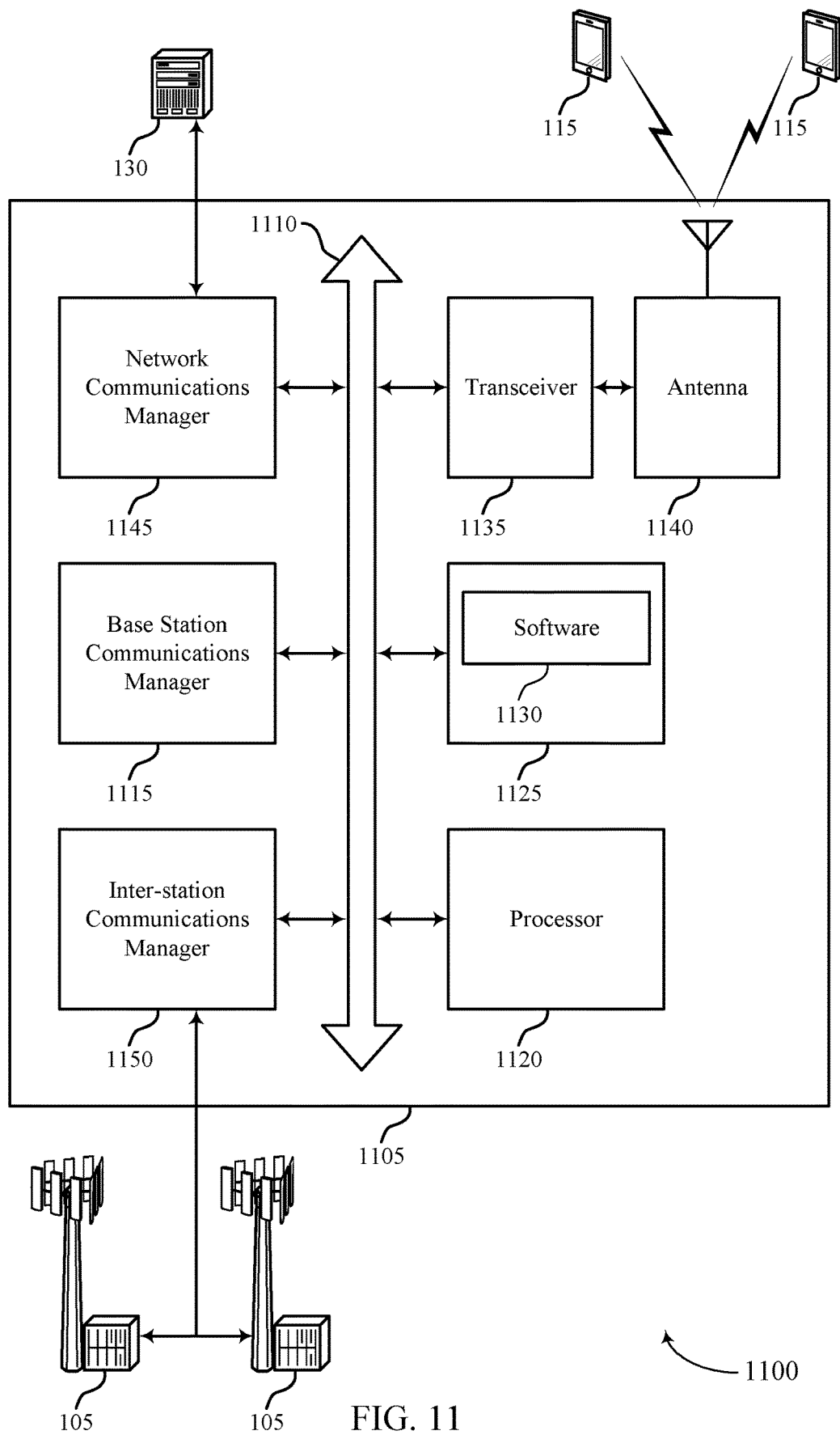
FIG. 11 illustrates a block diagram of a system including a base station that supports power savings in accordance with aspects of the present disclosure.

FIG. 11 illustrates a block diagram of a system 1100 including a device 1105 that supports power savings (e.g., through mobile initiated dormancy) in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting enhanced power savings through mobile initiated dormancy).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support power savings techniques, for example, through mobile initiated dormancy. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

FIG. 12 shows a flowchart illustrating a method 1200 for power savings (e.g., through mobile initiated dormancy) in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may identify that a power level of the UE 115 is below a power threshold. The operations of 1205 may be performed according to the methods described herein. In certain examples, aspects of the operations of 1205 may be performed by a UE power manager as described with reference to FIGS. 4 through 7.

At 1210 the UE 115 may transmit a connection suspend request to a base station 105 based at least in part on the identification, the connection suspend request to transition the UE from a connected state to a dormancy state. The operations of 1210 may be performed according to the methods described herein. In certain examples, aspects of the operations of 1210 may be performed by a connection suspend request component as described with reference to FIGS. 4 through 7.

At 1215 the UE 115 may receive, from the base station, a response to the connection suspend request indicating whether the UE 115 is to transition to the dormancy state. The operations of 1215 may be performed according to the methods described herein. In certain examples, aspects of the operations of 1215 may be performed by a UE dormancy manager as described with reference to FIGS. 4 through 7.

FIG. 13 shows a flowchart illustrating a method 1300 for power savings (e.g., through mobile initiated dormancy) in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may identify that a power level of the UE 115 is below a power threshold. The operations of 1305 may be performed according to the methods described herein. In certain examples, aspects of the operations of 1305 may be performed by a UE power manager as described with reference to FIGS. 4 through 7.

At 1310 the UE 115 may transmit a connection suspend request to a base station 105 based at least in part on the identification, the connection suspend request to transition the UE 115 from a connected state to a dormancy state. The operations of 1310 may be performed according to the methods described herein. In certain examples, aspects of the operations of 1310 may be performed by a connection suspend request component as described with reference to FIGS. 4 through 7.

At 1315 the UE 115 may receive, from the base station 105, a response to the connection suspend request indicating whether the UE 115 is to transition to the dormancy state, wherein the response comprises a confirmation of the connection suspend request. The operations of 1315 may be performed according to the methods described herein. In certain examples, aspects of the operations of 1315 may be performed by a UE dormancy manager as described with reference to FIGS. 4 through 7.

At 1320 the UE 115 may transition from the connected state to the dormancy state based at least in part on the response to the connection suspend request. The operations of 1320 may be performed according to the methods described herein. In certain examples, aspects of the operations of 1320 may be performed by a UE state manager as described with reference to FIGS. 4 through 7.

At 1325 the UE 115 may enter a modem of the UE 115 into the dormancy state (i.e., cause the modem of the UE 115 to enter into the dormancy state). The operations of 1325 may be performed according to the methods described herein. In certain examples, aspects of the operations of 1325 may be performed by a UE dormancy manager as described with reference to FIGS. 4 through 7.

FIG. 14 shows a flowchart illustrating a method 1400 for power savings (e.g., through mobile initiated dormancy) in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify that a power level of the UE 115 is below a power threshold. The operations of 1405 may be performed according to the methods described herein. In certain examples, aspects of the operations of 1405 may be performed by a UE power manager as described with reference to FIGS. 4 through 7.

At 1410 the UE 115 may transmit a connection suspend request to a base station 105 based at least in part on the identification, the connection suspend request to transition the UE 115 from a connected state to a dormancy state. The operations of 1410 may be performed according to the methods described herein. In certain examples, aspects of the operations of 1410 may be performed by a connection suspend request component as described with reference to FIGS. 4 through 7.

At 1415 the UE 115 may receive, from the base station 105, a response to the connection suspend request indicating whether the UE 115 is to transition to the dormancy state, wherein the response comprises a denial of the connection suspend request. The operations of 1415 may be performed according to the methods described herein. In certain examples, aspects of the operations of 1415 may be performed by a UE dormancy manager as described with reference to FIGS. 4 through 7.

At 1420 the UE 115 may maintain the connected state based at least in part on the response to the connection suspend request. The operations of 1420 may be performed according to the methods described herein. In certain examples, aspects of the operations of 1420 may be performed by a UE state manager as described with reference to FIGS. 4 through 7.

FIG. 15 shows a flowchart illustrating a method 1500 for power savings (e.g., through mobile initiated dormancy) in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify that a power level of the UE 115 is below a power threshold. The operations of 1505 may be performed according to the methods described herein. In certain examples, aspects of the operations of 1505 may be performed by a UE power manager as described with reference to FIGS. 4 through 7.

At 1510 the UE 115 may transmit a connection suspend request to a base station 105 based at least in part on the identification, the connection suspend request to transition the UE 115 from a connected state to a dormancy state. The operations of 1510 may be performed according to the methods described herein. In certain examples, aspects of the operations of 1510 may be performed by a connection suspend request component as described with reference to FIGS. 4 through 7.

At 1515 the UE 115 may receive, from the base station 105, a response to the connection suspend request indicating whether the UE 115 is to transition to the dormancy state. The operations of 1515 may be performed according to the methods described herein. In certain examples, aspects of the operations of 1515 may be performed by a UE dormancy manager as described with reference to FIGS. 4 through 7.

At 1520 the UE 115 may transition from the connected state to the dormancy state based at least in part on the response to the connection suspend request. The operations of 1520 may be performed according to the methods described herein. In certain examples, aspects of the operations of 1520 may be performed by a UE state manager as described with reference to FIGS. 4 through 7.

At 1525 the UE 115 may determine, while in the dormancy state, to resume communications with the base station 105. The operations of 1525 may be performed according to the methods described herein. In certain examples, aspects of the operations of 1525 may be performed by a UE dormancy manager as described with reference to FIGS. 4 through 7.

At 1530 the UE 115 may transmit, to the base station 105, a connection resume request to transition from the dormancy state to the connected state. The operations of 1530 may be performed according to the methods described herein. In certain examples, aspects of the operations of 1530 may be performed by a connection resume request component as described with reference to FIGS. 4 through 7.

FIG. 16 shows a flowchart illustrating a method 1600 for power savings (e.g., through mobile initiated dormancy) in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may receive a connection suspend request from a UE 115, the connection suspend request to transition the UE 115 from a connected state to a dormancy state. The operations of 1605 may be performed according to the methods described herein. In certain examples, aspects of the operations of 1605 may be performed by a connectivity manager as described with reference to FIGS. 8 through 11.

At 1610 the base station 105 may determine whether to allow the UE 115 to transition to the dormancy state based at least in part on the connection suspend request. The operations of 1610 may be performed according to the methods described herein. In certain examples, aspects of the operations of 1610 may be performed by a base station dormancy manager as described with reference to FIGS. 8 through 11.

At 1615 the base station 105 may transmit a response to the connection suspend request to the UE 115, the response comprising, based at least in part on the determination, a confirmation of the connection suspend request, or a denial of the connection suspend request. The operations of 1615 may be performed according to the methods described herein. In certain examples, aspects of the operations of 1615 may be performed by a response manager as described with reference to FIGS. 8 through 11.

FIG. 17 shows a flowchart illustrating a method 1700 for power savings (e.g., through mobile initiated dormancy) in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may receive a connection suspend request from a UE 115, the connection suspend request to transition the UE 115 from a connected state to a dormancy state. The operations of 1705 may be performed according to the methods described herein. In certain examples, aspects of the operations of 1705 may be performed by a connectivity manager as described with reference to FIGS. 8 through 11.

At 1710 the base station 105 may determine to allow the UE to transition to the dormancy state. The operations of 1710 may be performed according to the methods described herein. In certain examples, aspects of the operations of 1710 may be performed by a connectivity manager as described with reference to FIGS. 8 through 11.

At 1715 the base station 105 may transmit a response to the connection suspend request to the UE, the response comprising, based at least in part on the determination, a confirmation of the connection suspend request. The operations of 1715 may be performed according to the methods described herein. In certain examples, aspects of the operations of 1715 may be performed by a response manager as described with reference to FIGS. 8 through 11.

FIG. 18 shows a flowchart illustrating a method 1800 for power savings (e.g., through mobile initiated dormancy) in accordance with aspects of the present disclosure. The operations of method 1800 may be implemented by a base station 105 or its components as described herein. For example, the operations of method 1800 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive a connection suspend request from a UE 115, the connection suspend request to transition the UE 115 from a connected state to a dormancy state. The operations of 1805 may be performed according to the methods described herein. In certain examples, aspects of the operations of 1805 may be performed by a connectivity manager as described with reference to FIGS. 8 through 11.

At 1810 the base station 105 may identify, based at least in part on the received connection suspend request, an indication of a duration that the UE 115 will be in the dormancy state, or a priority associated with the transition to the dormancy state, or a request to cache a UE security context, or a request to cache one or more UE connection parameters, or a combination thereof. The operations of 1810 may be performed according to the methods described herein. In certain examples, aspects of the operations of 1810 may be performed by a base station dormancy manager as described with reference to FIGS. 8 through 11.

At 1815 the base station 105 may determine whether to allow the UE 115 to transition to the dormancy state based at least in part on the connection suspend request. The operations of 1815 may be performed according to the methods described herein. In certain examples, aspects of the operations of 1815 may be performed by a base station dormancy manager as described with reference to FIGS. 8 through 11.

At 1820 the base station 105 may transmit a response to the connection suspend request to the UE 115, the response comprising, based at least in part on the determination, a confirmation of the connection suspend request, or a denial of the connection suspend request. The operations of 1820 may be performed according to the methods described herein. In certain examples, aspects of the operations of 1820 may be performed by a response manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

establishing a radio resource control (RRC) connection with a network device via one or more common control channel (CCCH) transmissions over a signaling radio bearer 0 (SRB 0), wherein establishing the RRC connection comprises a configuration of a signaling radio bearer 1 (SRB 1) associated with dedicated control channel (DCCH) signaling, and wherein the UE is configured for operation in one of a plurality of RRC states comprising a connected state, an inactive state, and an idle state;

transmitting, to the network device via an uplink DCCH over the SRB 1, a message that comprises a field indicative of a connection suspend request based at least in part on a determination to transition from the connected state to the inactive state, the connection suspend request indicating a request to transition the UE from the connected state to the inactive state;

receiving, from the network device via a downlink DCCH over the SRB 1, a response to the connection suspend request indicating whether the UE is to transition to the inactive state;

transitioning from the connected state to the inactive state based at least in part on the response to the connection suspend request;

storing a security context and other connection related parameters based at least in part on transitioning from the connected state to the inactive state; and transmitting, to the network device, a connection resume request to transition from the inactive state to the connected state based at least in part on a determination, while in the inactive state, to resume communications with the network device.

2. The method of claim 1, wherein storing the security context and the other connection related parameters comprises:

storing the security context and the other connection related parameters within a database coupled to the UE.

3. The method of claim 1, wherein the security context comprises an access stratum context.

4. The method of claim 1, wherein the response to the connection suspend request comprises a radio resource control (RRC) release message.

5. The method of claim 1, wherein:

the message comprises an uplink DCCH message; and the response to the connection suspend request comprises a downlink DCCH message.

6. The method of claim 1, further comprising:

entering a modem of the UE into the inactive state, wherein the response comprises a confirmation of the connection suspend request.

7. The method of claim 1, further comprising:

receiving, from the network device, a response to the connection resume request that indicates a confirmation of the connection resume request; and transitioning from the inactive state to the connected state based at least in part on the confirmation.

8. The method of claim 1, wherein the connection suspend request, or the response to the connection suspend request, or the connection resume request, or a response to the connection resume request are sent using a radio resource control (RRC) message, or Layer 1 signaling, or a combination thereof.

9. The method of claim 8, wherein the Layer 1 signaling comprises uplink control information within a physical uplink control channel (PUCCH), or the uplink control information within a physical uplink shared channel (PUSCH), or an uplink medium access control (MAC) control element (CE), or a combination thereof.

10. The method of claim 1, wherein the connection suspend request comprises an indication of a duration for the inactive state, or a priority for transitioning to the inactive state, or a request to store a security context for the UE, or a request to store one or more connection parameters for the UE, or a combination thereof.

11. A method for wireless communication at a network device, comprising:

establishing a radio resource control (RRC) connection with a user equipment (UE) via one or more common control channel (CCCH) transmissions over a signaling radio bearer 0 (SRB 0), wherein establishing the RRC connection comprises a configuration of a signaling radio bearer 1 (SRB 1) associated with dedicated control channel (DCCH) signaling, and wherein the UE is configured for operation in one of a plurality of RRC states comprising a connected state, an inactive state, and an idle state;

receiving, from the UE via an uplink DCCH over the SRB 1, a message that comprises a field indicative of a connection suspend request, the connection suspend request indicating a request to transition the UE from the connected state to the inactive state;

determining whether to allow the UE to transition to the inactive state based at least in part on the connection suspend request and the UE being configured for the operation in one of the plurality of RRC states comprising the connected state, the inactive state, and the idle state;

transmitting, to the UE via a downlink DCCH over the SRB 1, a response to the connection suspend request, the response comprising, based at least in part on an allowance for the UE to transition to the inactive state, a confirmation of the connection suspend request or a denial of the connection suspend request;

storing a security context and other connection related parameters based at least in part on allowing the UE to transition from the connected state to the inactive state;

receiving, from the UE, a connection resume request to transition the UE from the inactive state to the connected state; and transmitting a response to the connection resume request to the UE confirming the connection resume request.

12. The method of claim 11, wherein storing the security context and the other connection related parameters comprises:

storing the security context and the other connection related parameters based at least in part on receiving the connection suspend request.

13. The method of claim 11, wherein the security context comprises an access stratum context.

14. The method of claim 11, wherein the response to the connection suspend request comprises a radio resource control (RRC) release message.

15. The method of claim 11, wherein:

the message comprises an uplink DCCH message; and the response to the connection suspend request comprises a downlink DCCH message.

16. An apparatus for wireless communication at a user equipment (UE), comprising:

one or more processors; and one or more memories coupled with the one or more processors, the one or more memories storing instructions executable by the one or more processors to cause the apparatus to:

establish a radio resource control (RRC) connection with a network device via one or more common control channel (CCCH) transmissions over a signaling radio bearer 0 (SRB 0), wherein establishing the RRC connection comprises a configuration of a signaling radio bearer 1 (SRB 1) associated with dedicated control channel (DCCH) signaling, and wherein the UE is configured for operation in one of a plurality of RRC states comprising a connected state, an inactive state, and an idle state;

transmit, to the network device via an uplink DCCH over the SRB 1, a message that comprises a field indicative of a connection suspend request based at least in part on a determination to transition from the connected state to the inactive state, the connection suspend request indicating a request to transition the UE from the connected state to the inactive state;

receive, from the network device via a downlink DCCH over the SRB 1, a response to the connection suspend request indicating whether the UE is to transition to the inactive state;

transition from the connected state to the inactive state based at least in part on the response to the connection suspend request;

store a security context and other connection related parameters based at least in part on transitioning from the connected state to the inactive state; and transmit, to the network device, a connection resume request to transition from the inactive state to the connected state based at least in part on a determination, while in the inactive state, to resume communications with the network device.

17. The apparatus of claim 16, wherein the instructions to maintain store the security context and the other connection related parameters are executable by the one or more processors to cause the apparatus to:

store the security context and the other connection related parameters within a database coupled to the UE.

18. The apparatus of claim 16, wherein the security context comprises an access stratum context.

19. The apparatus of claim 16, wherein the response to the connection suspend request comprises a radio resource control (RRC) release message.

20. The apparatus of claim 16, wherein:

the message comprises an uplink DCCH message; and the response to the connection suspend request comprises a downlink DCCH message.

21. The apparatus of claim 16, wherein the instructions are further executable by the one or more processors to cause the apparatus to:

enter a modem of the UE into the inactive state, wherein the response comprises a confirmation of the connection suspend request.

22. The apparatus of claim 16, wherein the instructions are further executable by the one or more processors to cause the apparatus to:

receive, from the network device, a response to the connection resume request indicating a confirmation of the connection resume request; and transition from the inactive state to the connected state based at least in part on the confirmation.

23. The apparatus of claim 16, wherein the connection suspend request, or the response to the connection suspend request, or the connection resume request, or a response to the connection resume request are sent using a radio resource control (RRC) message, or Layer 1 signaling, or a combination thereof.

24. The apparatus of claim 23, wherein the Layer 1 signaling comprises uplink control information within a physical uplink control channel (PUCCH), or the uplink control information within a physical uplink shared channel (PUSCH), or an uplink medium access control (MAC) control element (CE), or a combination thereof.

25. The apparatus of claim 16, wherein the connection suspend request comprises an indication of a duration for the inactive state, or a priority for the transition to the inactive state, or a request to store the security context for the UE, or a request to store one or more connection parameters for the UE, or a combination thereof.

26. An apparatus for wireless communication at a network device, comprising:

one or more processors; and one or more memories coupled with the one or more processors, the one or more memories storing instructions executable by the one or more processors to cause the apparatus to:

establish a radio resource control (RRC) connection with a user equipment (UE) via one or more common control channel (CCCH) transmissions over a signaling radio bearer 0 (SRB 0), wherein establishing the RRC connection comprises a configuration of a signaling radio bearer 1 (SRB 1) associated with dedicated control channel (DCCH) signaling, and wherein the UE is configured for operation in one of a plurality of RRC states comprising a connected state, an inactive state, and an idle state;

receive, from the UE via an uplink DCCH over the SRB 1, a message that comprises a field indicative of a connection suspend request, the connection suspend request indicating a request to transition the UE from the connected state to the inactive state;

determine whether to allow the UE to transition to the inactive state based at least in part on the connection suspend request and the UE being configured for the operation in one of the plurality of RRC states comprising the connected state, the inactive state, and the idle state;

transmit, to the UE via a downlink DCCH over the SRB 1, a response to the connection suspend request, the response comprising, based at least in part on an allowance for the UE to transition to the inactive state, a confirmation of the connection suspend request or a denial of the connection suspend request;

store a security context and other connection related parameters based at least in part on allowing the UE to transition from the connected state to the inactive state;

receive, from the UE, a connection resume request to transition the UE from the inactive state to the connected state; and transmit a response to the connection resume request to the UE confirming the connection resume request.

27. The apparatus of claim 26, wherein the instructions to store the security context and the other connection related parameters are executable by the one or more processors to cause the apparatus to:

store the security context and the other connection related parameters based at least in part on receiving the connection suspend request.

28. The apparatus of claim 26, wherein the security context comprises an access stratum context.

29. The apparatus of claim 26, wherein the response to the connection suspend request comprises a radio resource control (RRC) release message.

30. The apparatus of claim 26, wherein:

the message comprises an uplink DCCH message; and the response to the connection suspend request comprises a downlink DCCH message.

\* \* \* \* \*